United States Patent
Jang et al.

(10) Patent No.: US 10,148,823 B2
(45) Date of Patent: Dec. 4, 2018

(54) METHOD OF CANCELLING ECHO AND ELECTRONIC DEVICE THEREOF

(71) Applicant: Samsung Electronics Co., Ltd., Gyeonggi-do (KR)

(72) Inventors: Sung-Woon Jang, Gyeonggi-do (KR); Sang-Wook Shin, Seoul (KR); Sungwan Youn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 242 days.

(21) Appl. No.: 15/075,313

(22) Filed: Mar. 21, 2016

(65) Prior Publication Data

US 2016/0277588 A1 Sep. 22, 2016

(30) Foreign Application Priority Data

Mar. 20, 2015 (KR) .......................... 10-2015-0039122

(51) Int. Cl.
*H04M 9/08* (2006.01)
*H04W 4/60* (2018.01)
*H04M 1/60* (2006.01)

(52) U.S. Cl.
CPC ............. *H04M 9/082* (2013.01); *H04W 4/60* (2018.02); *H04M 1/6008* (2013.01)

(58) Field of Classification Search
CPC ... G10L 21/0208; G10L 21/0264; H04B 3/23; H04M 3/18; H04M 9/082

(Continued)

(56) References Cited

U.S. PATENT DOCUMENTS 5,706,344 A * 1/1998 Finn ...................... G10K 11/178
 379/406.09
6,449,361 B1 * 9/2002 Okuda .................. H04M 9/082
 379/406.01

(Continued)

FOREIGN PATENT DOCUMENTS

JP 2001-100785 A 4/2001
KR 10-0743062 B1 7/2007

*Primary Examiner* — Gerald Gauthier
(74) *Attorney, Agent, or Firm* — Cha & Reiter, LLC

(57) ABSTRACT

Disclosed are an apparatus and a method of cancelling an echo signal flowing in a microphone of an electronic device. The electronic device may include: a microphone configured to receive a sound signal; an Application Processor (AP) configured to execute an application; a communication module configured to control a voice call service; a speaker configured to output a sound signal; an audio processing module configured to process an output of at least one of an audio signal received from the AP, a voice signal received from the communication module, or a combined signal to the speaker; a first Acoustic Echo Canceller (AEC) configured to cancel an echo of the sound signal received through the microphone based on the output from the audio processing module and provide the signal to the AP, the first AEC being located in at least one of the AP, the audio processing module, and an external pre-processing module; and a second AEC configured to cancel an echo of the sound signal received through the microphone based on the output from the audio processing module and provide the signal to the communication module, the second AEC being located in at least one of the communication module, the audio processing module, and the external pre-processing module. Other embodiments may be possible.

10 Claims, 25 Drawing Sheets

(58) Field of Classification Search
USPC ....... 348/14.04; 379/406.01, 406.08, 406.09,
379/406.12, 392.01, 406.05; 381/57, 66,
381/71.8, 94.3, 94.7; 455/570; 704/226,
704/500; 345/156; 382/103
See application file for complete search history.

(56) References Cited

U.S. PATENT DOCUMENTS

| | | | | |
|---|---|---|---|---|
| 7,206,404 B2* | 4/2007 | Parry | ............... | H04M 9/08 379/406.01 |
| 7,613,310 B2* | 11/2009 | Mao | ............... | G10L 21/0208 367/119 |
| 7,627,139 B2* | 12/2009 | Marks | ............... | A63F 13/00 345/156 |
| 7,912,211 B1* | 3/2011 | Lambert | ............... | H04M 9/085 379/406.08 |
| 8,811,602 B2 | 8/2014 | Khanduri et al. | | |
| 9,246,545 B1* | 1/2016 | Ayrapetian | ............... | H04M 9/082 |
| 9,754,605 B1* | 9/2017 | Chhetri | ............... | G10L 21/0264 |
| 9,826,085 B2* | 11/2017 | Kechichian | ............... | H04M 9/082 |
| 2005/0041798 A1* | 2/2005 | Nowlin | ............... | G10L 19/012 379/392.01 |
| 2006/0222172 A1* | 10/2006 | Chhetri | ............... | H04M 9/082 379/406.05 |
| 2009/0046866 A1* | 2/2009 | Feng | ............... | H04M 9/082 381/66 |
| 2010/0033427 A1* | 2/2010 | Marks | ............... | H04N 13/10 345/156 |
| 2011/0178798 A1* | 7/2011 | Flaks | ............... | G10L 21/0208 704/226 |
| 2012/0027216 A1* | 2/2012 | Tirry | ............... | H04M 1/72569 381/57 |
| 2013/0003960 A1* | 1/2013 | Sollenberger | ............... | H04M 9/082 379/406.01 |
| 2013/0066638 A1* | 3/2013 | Mason | ............... | G10L 19/00 704/500 |
| 2013/0169739 A1* | 7/2013 | Cho | ............... | H04N 7/148 348/14.04 |
| 2013/0216056 A1 | 8/2013 | Thyssen | | |
| 2013/0332155 A1* | 12/2013 | Prakash | ............... | H04M 9/082 704/226 |
| 2013/0332156 A1* | 12/2013 | Tackin | ............... | H04M 1/6041 704/226 |
| 2014/0037100 A1* | 2/2014 | Giesbrecht | ............... | G10K 11/002 381/71.8 |
| 2014/0211966 A1* | 7/2014 | Hetherington | ............... | G10K 11/178 381/94.3 |
| 2014/0334620 A1* | 11/2014 | Yemdji | ............... | G10L 21/0232 379/406.08 |
| 2015/0050967 A1* | 2/2015 | Bao | ............... | H04M 9/082 455/570 |
| 2015/0063579 A1* | 3/2015 | Bao | ............... | H04M 9/082 381/66 |
| 2015/0187348 A1* | 7/2015 | Kang | ............... | G10L 21/0208 381/66 |
| 2016/0050489 A1* | 2/2016 | Lashkari | ............... | H04M 9/08 381/66 |
| 2016/0094718 A1* | 3/2016 | Mani | ............... | H04M 9/082 379/406.12 |
| 2016/0127535 A1* | 5/2016 | Theverapperuma | .. | H04M 3/002 455/570 |
| 2016/0277588 A1* | 9/2016 | Jang | ............... | H04M 9/082 |
| 2017/0061980 A1* | 3/2017 | Jang | ............... | H04R 3/04 |

\* cited by examiner

METHOD OF CANCELLING ECHO AND ELECTRONIC DEVICE THEREOF

CLAIM OF PRIORITY

This application claims priority under 35 U.S.C. § 119(a) to Korean Application Serial No. 10-2015-0039122, which was filed in the Korean Intellectual Property Office on Mar. 20, 2015, the entire content of which is hereby incorporated by reference.

TECHNICAL FIELD

The present disclosure relates to an apparatus and a method for cancelling an echo in an electronic device.

BACKGROUND

With the development of information and communication technologies and semiconductor technologies, various types of electronic devices have developed into multimedia devices that provide various multimedia services. For example, electronic devices may provide diverse multimedia services such as broadcast services, wireless Internet services, camera services, and music reproduction services.

The electronic device may provide various services to increase user convenience. For example, the electronic device may provide an audio service using an audio signal collected through a microphone such as a recording service, a voice recording service during a call, a voice recognition service, a voice message, and the like.

SUMMARY

A signal (an audio signal or a voice signal) output through a speaker of an electronic device may be captured by a microphone of the same electronic device as an echo signal. The electronic device may have poor quality of audio service due to the echo signal flowing in through the microphone. For example, a voice recognition rate of the electronic device may deteriorate due to the echo signal flowing in through the microphone because the signal provided to the voice recognition service includes not only the intended signal for voice recognition, but the output of the speaker as well. In another circumstance, the quality of a voice call service may also deteriorate. During a voice call, the user of the electronic device talks with another party using another electronic device. The speech of the other party of provided to the user through the speaker, while the voice of the speaker is provided to the other party through a microphone. However, if the microphone captures receives output from the speaker, the other party will also hear an echo of their voice, thereby deteriorating the quality of the voice call.

The electronic device may cancel the echo signal by using an Acoustic Echo Canceller (AEC) to prevent the performance deterioration due to the echo signal. For example, the electronic device may cancel, through the AEC, the echo signal generated as an audio signal or a voice signal output from a speaker of the electronic device that is captured by the microphone, thereby improving quality of a user's voice signal input into the microphone and preventing signal distortion due to an echo component. Specifically, the AEC may set the audio signal or the voice signal output through the speaker of the electronic device as echo reference data. The AEC may determine, as the echo signal, a signal having a frequency characteristic similar to the echo reference data among microphone input signals of the electronic device through frequency analysis and cancel or attenuate the corresponding signal. Accordingly, in order to cancel the echo signal, the electronic device may input a speaker output signal (for example, echo reference data) and a microphone input signal (Tx input) into the AEC.

However, when an audio service function is also provided while a call service is provided, the electronic device may have a limit in cancelling the echo signal since provision of the echo reference data (at least one of the audio signal and the voice signal) to the AEC for the echo signal cancelling has a limitation. That is, quality of an audio service provided by the electronic device may deteriorate due to the echo signal, which has not been cancelled.

Various embodiments of the present disclosure may provide an apparatus and a method for cancelling the echo signal flowing in the microphone of the electronic device.

In accordance with an embodiment of the present disclosure an electronic device is provided. The electronic device comprises: a microphone configured to receive a sound signal; an Application Processor (AP) configured to execute an application; a communication module configured to control a voice call service; a speaker configured to output a sound signal; an audio processing module configured to process an output of at least one of an audio signal received from the AP, a voice signal received from the communication module, or a combined signal to the speaker; a first Acoustic Echo Canceller (AEC) configured to cancel an echo of the sound signal received through the microphone based on the output from the audio processing module and provide the signal to the AP, the first AEC being located in at least one of the AP, the audio processing module, and an external pre-processing module; and a second AEC configured to cancel an echo of the sound signal received through the microphone based on the output from the audio processing module and provide the signal to the communication module, the second AEC being located in at least one of the communication module, the audio processing module, and the external pre-processing module.

In accordance with another embodiment of the present disclosure, a method of operating an electronic device is presented. The method comprises processing an output of at least one of an audio signal from an Application Processor (AP) and a voice signal from a communication module to the outside by an audio processing module; outputting the signal processed by the audio processing module through a speaker of the electronic device; and cancelling an echo of a voice signal received through a microphone of the electronic device based on the signal output from the audio processing module, wherein the cancelling of the echo comprises cancelling the echo of the sound signal received through the microphone of the electronic device based on the signal output from the audio processing module selectively through at least one of a first Acoustic Echo Canceller (AEC) and a second AEC, wherein the first AEC is located in at least one of the AP, the audio processing module, and an external pre-processing module and provides the sound signal, from which the echo is cancelled, to the AP, and the second AEC is located in at least one of the communication module, the audio processing module, and the external pre-processing module and provides the sound signal, from which the echo is cancelled, to the communication module.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
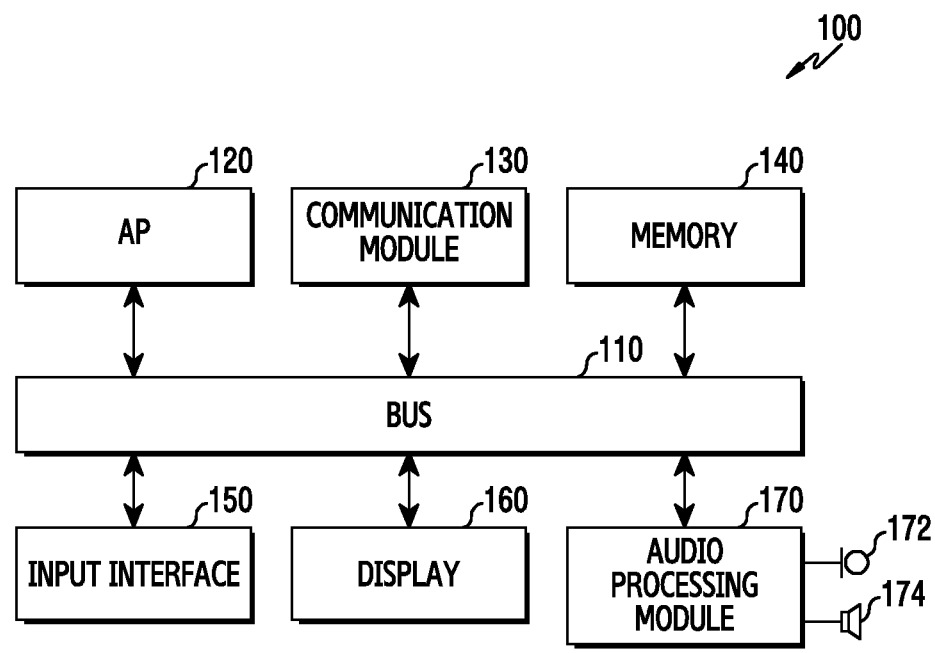
FIG. 1 is a block diagram of an electronic device according to an embodiment of the present disclosure.

Hereinafter, various embodiments of the present disclosure will be described with reference to the accompanying drawings. However, it should be understood that the various embodiments of the present disclosure are not limited to specific embodiments and include various modifications, equivalents, and/or alternatives thereof. In connection with descriptions of the drawings, like reference numerals designate like elements.

As used herein, the expression "have", "may have", "include", or "may include" refers to the existence of a corresponding feature (e.g., numeral, function, operation, or constituent element such as component), and does not exclude one or more additional features.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the present disclosure.

It will be understood that when an element (e.g., a first element) is referred to as being "(operatively or communicatively) coupled with/to" or "connected to" another element (e.g., a second element), it can be directly connected to the other element, or can be connected to the other element through another element (e.g., a third element). In contrast, it could be understood that when an element (e.g., a first element) is referred to as being "directly connected to" or "directly coupled to" another element (e.g., a second element), there is no intervening element (e.g., a third element) between the element and the other element.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the electronic device "can~" together with other electronic devices or components. For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

"Echo cancellation" of a signal shall not be construed as requiring complete removal of an echo component and may include reduction of the echo component of in the signal to a degree acceptable for the particular usage of the signal.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, eve the terms defined herein may not be construed to exclude embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Hereinafter, the present disclosure describes a technology for cancelling an echo signal flowing in an electronic device through a microphone.

FIG. 1 is a block diagram of an electronic device according to various embodiments of the present disclosure.

Referring to FIG. 1, an electronic device 100 may include a bus 110, an Application Processor (AP) 120 (e.g., including processing circuitry), a communication module 130 (e.g., including communication circuitry), a memory 140, an input interface 150 (e.g., including input circuitry), a display 160 (e.g., including a display panel and display circuitry), and an audio processing module 170 (e.g., including audio processing circuitry). According to various embodiments of the present disclosure, the electronic device 100 may omit at least one of the elements additionally include another element.

The bus 110 may be a circuit that connects the elements (for example, the AP 120, the communication module 130, the memory 140, the input interface 150, the display 160, or the audio processing module 170) and transmits communication (for example, control messages) between the elements.

The AP 120 may control a plurality of hardware or software elements connected to the AP 120 by driving an operating system or an application program. The AP 120 may process various types of data including multimedia data or perform calculations.

According to an embodiment, the AP 120 may generate audio signals (for example, Text To Speech (TTS), key tone, effect sound, and the like) corresponding to application programs. The AP 120 may drive an application program (for example, a voice recognition program) by using a microphone input signal from which an echo is cancelled.

The communication module 130 may include a Communication Processor (CP). The communication module 130 may transmit/receive data through communication between the electronic device 100 and another electronic device (for example, a counterpart electronic device or a server) connected through a network.

According to an embodiment, the communication module 130 may transmit/receive a voice signal for a voice call service to/from another electronic device through the network. In this case, the communication module 130 may transmit a microphone input signal (voice signal) from which an echo is cancelled to another electronic device.

The memory 140 may include a volatile memory and/or a non-volatile memory. The memory 140 may store commands or data related to one or more other elements of the electronic device 100. According to an embodiment, the memory 140 may store software and/or a program. For example, the program may include a kernel, middleware, an Application Programming Interface (API), or applications (or application programs).

The input interface 150 may transfer a command or data, which is input from a user or another external device, to other element(s) of the electronic device 100.

The display 160 may display, for example, various types of contents (for example, text, images, videos, icons, or symbols) to the user. For example, the display 160 may include a Liquid Crystal Display (LCD), a Light Emitting Diode (LED) display, an Organic Light Emitting Diode (OLED) display, a Micro Electro Mechanical System (MEMS) display, or an electronic paper display. For example, the display 160 may include a touch screen and receive a touch, gesture, proximity, or hovering input using an electronic pen or a user's body part.

The audio processing module 170 may provide an audio interface between the user and the electronic device 100 through a microphone 172 and a speaker 174. For example, the audio processing module 170 may process a sound signal received through the microphone 172 by at least one of the AP 120 and the communication module 130. For example, the audio processing module 170 may convert the sound signal received through the microphone phone 172 into a digital signal and encode the digital signal. For example, the audio processing module 170 may process at least one of an audio signal and a voice signal received from at least one of the AP 120 and the communication module 130 to be output through the speaker 174. For example, the audio processing module 170 may decode at least one of the audio signal and the voice signal received from at least one of the AP 120 and the communication module 130 and convert the signal into an analog signal. For example, the audio processing module 170 may include a codec. Additionally, in certain embodiments, the audio processing module may include a codec in accordance with various standards for audio compression, such as MPEG-1, Audio Layer 3.

According to an embodiment, the audio processing module 170 may output at least one of the audio signal received from the AP 120 and the voice signal received from the communication module 130 through the speaker 174. For example, the audio processing module 170 may combine an audio signal received from the AP 120 and a voice signal received from the communication module 130 into one signal and output the combined signal through the speaker 174. For example, the audio processing module 170 may output at least one of the audio signal received from the AP 120 and the voice signal received from the communication module 130 through the speaker 174.

According to an embodiment, the audio processing module 170 may convert the microphone input signal received through the microphone 172 into a digital signal and transmit the digital signal to at least one of the AP 120 and the communication module 130. The speaker 174 may include at least one of an earpiece and an external speaker.

According to various embodiments of the present disclosure, the AP 120 may refer to a module for driving an application. For example, the AP 120 may include a user interface driver for driving an application, a framework part for controlling an audio route (device setting) and a volume, and a Hardware Abstract Layer (HAL) part corresponding to an interface between layers.

Figure 2:
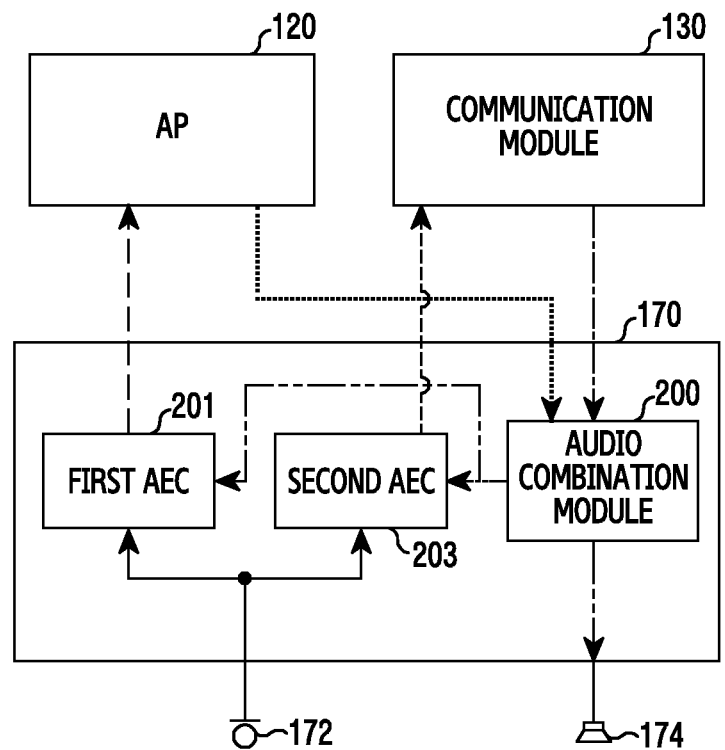
FIG. 2 illustrates a structure for cancelling an echo signal by using au audio processing module by the electronic device according to various embodiments of the present disclosure.

FIG. 2 illustrates a structure for cancelling an echo signal by using an audio processing module in the electronic device according to various embodiments of the present disclosure. Hereinafter, a structure for cancelling an echo signal flowing in the electronic device of FIG. 1 through the microphone 172 will be described.

Referring to FIG. 2, the audio processing module 170 may combine the audio signal (for example, TTS, key tone, effect sound, or the like) received from the AP and the voice signal (for example, counterpart's call voice signal) received from the communication module 130 into one signal through an audio combination module 200 and output the signal through the speaker 174. In certain embodiments, the audio combination module 200 may include, for example, a signal combiner, a multiplexer, an adder or a combination thereof. For example, when the audio combination module 200 receives the audio signal or the voice signal from the AP 120 or the communication module 130, audio combination module 200 may output the audio signal through the speaker 174, the voice signal through the speaker 174, or a signal combining the audio signal and the voice signal (combined signal) through the speaker 174.

According to an embodiment, the audio combination module 200 provides the particular one of the audio signal, voice signal, or combined signal output through the speaker 174 to the first AEC 201 and second AEC 203. The audio combination module 200 may transmit at least one of the audio signal and the voice signal output to the speaker 174 to a first AEC 201 and a second AEC 203 so that the audio signal or the voice signal can be used as echo reference data for cancelling the echo signal. For example, the audio combination module 200 may transmit the combined signal output to the speaker 174 to the first AEC 201 and the second AEC 203 so that the combined signal can be used as the echo reference data for cancelling the echo signal. For example, the audio combination module 200 may transmit the audio signal or the voice signal output to the speaker 174 to the first AEC 201 and the second AEC 203 so that the audio signal or the voice signal can be used as the echo reference data for cancelling the echo signal.

According to an embodiment, the audio processing module 170 may include the first Acoustic Echo Canceller (AEC) 201 and the second AEC 203 for cancelling the echo signal flowing in through the microphone 172.

The first AEC 201 may cancel an echo signal included in the microphone input signal based on the echo reference data (for example, the audio signal, the voice signal, or the combined signal) received from the audio combination module 200 to drive an application of the AP 120. For example, when the AP 120 provides a voice recognition service, the microphone input signal may include a voice signal for voice recognition and an echo signal. The first AEC 201 may cancel the echo signal to increase a voice recognition rate of the AP 120 to an extent that the voice signal included in the microphone input signal is not distorted or distortion is reduced to a degree that permits an acceptable voice recognition rate. The microphone input signal may include the audio signal and the voice signal collected through the microphone 172.

According to an embodiment, the AP 120 may drive an application based on the microphone input signal, from which the echo signal is cancelled, received from the first AEC 201. For example, the AP 120 may provide the voice recognition service based on the microphone input signal, from which the echo signal is cancelled, received from the first AEC 201.

The second AEC 203 may cancel an echo signal included in the microphone input signal, independently from the first AEC 201, to optimize the microphone input signal for the voice call service based on the echo reference data (for example, the audio signal, the voice signal, or the combined signal) received from the audio combination module 200 for the voice call service of the communication module 130. For example, an echo signal cancelling level (for example, echo signal cancelling intensity) of the second AEC 203 may be set to be higher than an echo signal canceling level of the first AEC 201. For example, as the echo signal cancelling level is higher, an echo signal cancelling efficiency may become increase. For example, during a voice call, the level of echo cancellation may be high enough so that any echo in the signal provided by the communication module 130 is at a level below audible range of the human ear.

According to an embodiment, the communication module 130 may provide the voice call service based on the microphone input signal, from which the echo signal is cancelled, received from the second AEC 203. For example, the communication module 130 may transmit the microphone input signal, from which the echo signal is cancelled, received from the second AEC 203 to another electronic device that provides the voice call service.

In FIG. 2, the audio processing module 170 may include the first AEC 201 for the AP 120 and the second AEC 203 for the communication module 130.

According to various embodiments of the present disclosure, the audio processing module 170 may selectively cancel the echo signal for the AP and the echo signal for the communication module 130 by using one AEC. For example, when an application is executed using the AP 120, the AEC of the audio processing module 170 may cancel the echo signal at an echo signal cancelling level corresponding to the AP 120. If no voice call is in progress, the AEC 203 of the communication module 130 may not perform echo cancelling. For example, when the voice call service is provided using the communication module 130, the AEC of the audio processing module 170 may cancel the echo signal at an echo signal cancelling level corresponding to the communication module 130. If no application that uses voice or sound inputs is executed, the AEC 201 of the AP 120 may not perform echo cancelling. In certain embodiments, the AP 120 can control whether the AEC 201 performs echo canceling, while the communication module 130 controls whether the AEC 203 performs echo cancellation.

Figure 3:
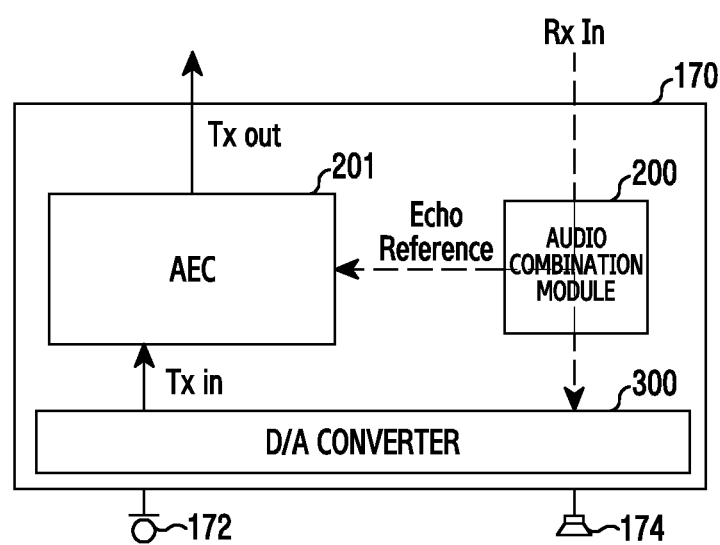
FIG. 3 is a detailed block diagram of the audio processing module for cancelling the echo signal according to various embodiments of the present disclosure.

FIG. 3 is a detailed block diagram of the audio processing module for cancelling the echo signal according to various embodiments of the present disclosure. Hereinafter, a detailed configuration of the audio processing module 170 for cancelling the echo signal as illustrated in FIG. 2 will be described.

Referring to FIG. 3, the audio processing module 170 may include the audio combination module 200, at least one AEC, and a D/A converter 300.

The audio combination module 200 may combine the audio signal received from the AP 120 and the voice signal received from the communication module 130 into one signal. For example, the audio combination module 200 may transmit the combined signal to the AEC 201 to cancel the echo signal.

According to an embodiment, when the audio signal or the voice signal is received from one element between the AP 120 and the communication module 130, the audio combination module 200 may transmit the corresponding signal to the D/A converter 300 without a signal combination process (that is bypass the signal combination process). In this case, the audio combination module 200 may transmit the combined signal to the AEC 201 to cancel the echo signal.

The D/A converter 300 may convert a digital signal into an analog signal or an analog signal into a digital signal. For example, the D/A converter 300 may convert a digital signal received from the audio combination module 200 into an analog signal which can be output through the speaker 174. For example, the D/A converter 300 may convert an analog signal input through the microphone 172 into a digital signal which can be processed by the audio processing module 170.

The AEC 201 may cancel the echo signal included in the microphone input signal based on echo reference data (for example, the signal output through the speaker 174) received from the audio combination module 200.

Figure 4:
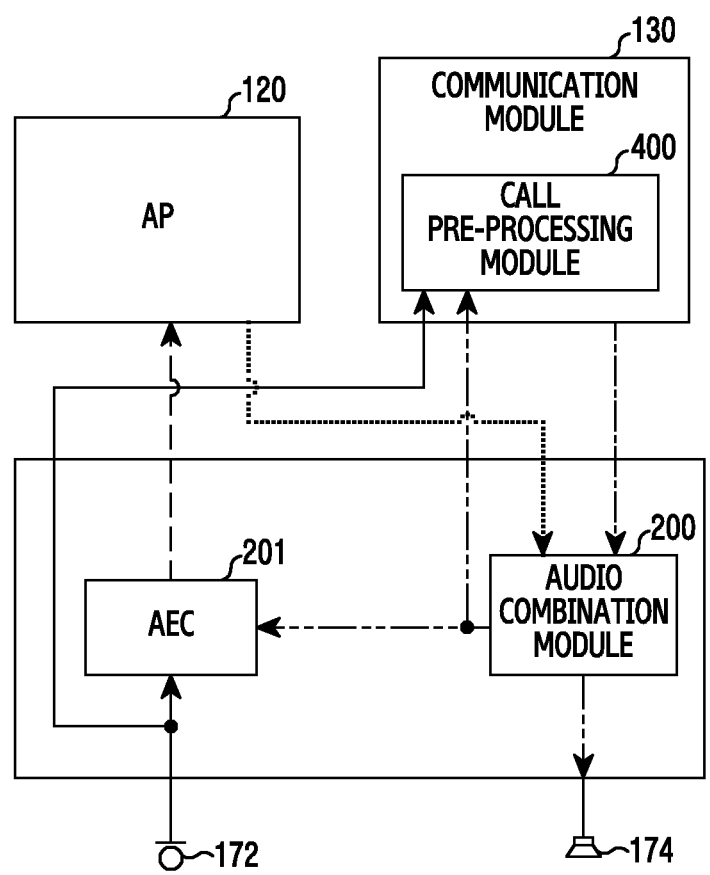
FIG. 4 illustrates a structure for cancelling the echo signal by using the audio processing module and the communication module by the electronic device according to various embodiments of the present disclosure.

FIG. 4 illustrates a structure for cancelling the echo signal by using the audio processing module and the communication module by the electronic device, where an AEC is included in a pre-processing module of the communication module, according to various embodiments of the present disclosure. Hereinafter, a structure for cancelling an echo signal flowing in the electronic device of FIG. 1 through the microphone 172 will be described.

Referring to FIG. 4, the audio combination module 200 of the audio processing module 170 may output at least one of the audio signal received from the AP 120, the voice signal received from the communication module 130, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (for example, the audio signal, the voice signal, or the combined signal) output to the speaker 174 to the first AEC 201 and a call pre-processing module 400 of the communication module 130 so that the signal can be used as echo reference data for the echo signal cancelling.

The first AEC 201 may cancel an echo signal included in the microphone input signal based on the echo reference data (for example, the audio signal, the voice signal, or the combined signal) received from the audio combination module 200 to drive an application of the AP 120.

According to an embodiment, the AP 120 may drive an application based on the microphone input signal, from which the echo signal is cancelled, received from the first AEC 201.

The call pre-processing module 400 of the communication module 130 may control audio processing such as a volume, AEC, Dynamic Range Controller (DRC), and Noise Suppression (NS) for the voice call service. For example, the call pre-processing module 400 may cancel the echo signal included in the microphone input signal based on the echo reference data (for example, the audio signal, the voice signal, or the combined signal) received from the audio combination module 200 for the voice call service of the communication module 130.

According to an embodiment, the communication module 130 may provide the voice call service based on the microphone input signal, from which the echo signal is cancelled, by using the call pre-processing module 400.

Figure 5:
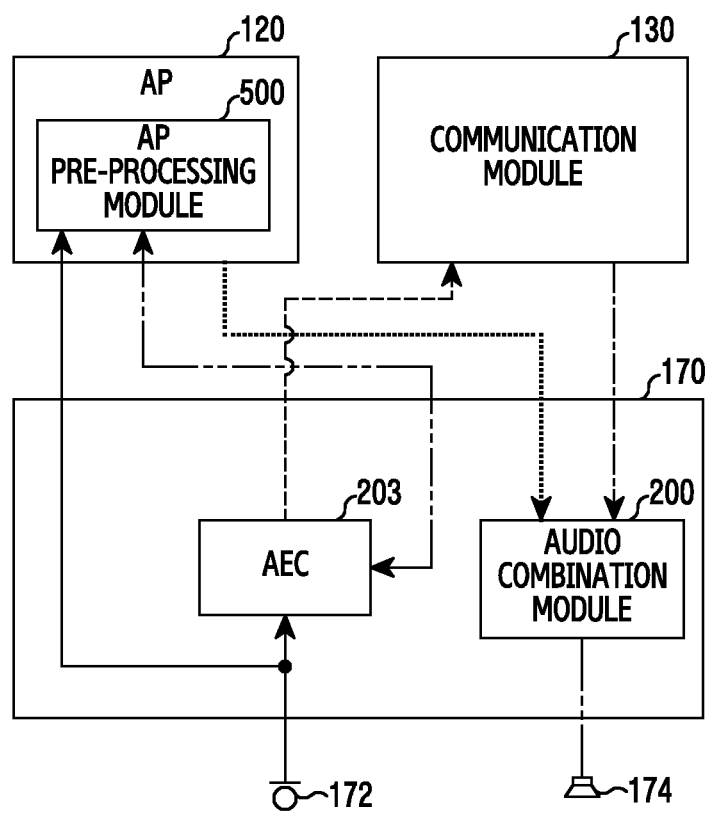
FIG. 5 illustrates a structure for cancelling the echo signal by using the audio processing module and the AP by the electronic device according to various embodiments of the present disclosure.

FIG. 5 illustrates a structure for cancelling the echo signal by using the audio processing module and the AP by the electronic device where an AEC is included in a pre-processing module of the AP 120 according to various embodiments of the present disclosure. Hereinafter, a structure for cancelling an echo signal flowing in the electronic device of FIG. 1 through the microphone 172 will be described.

Referring to FIG. 5, the audio combination module 200 of the audio processing module 170 may output the audio signal received from the AP 120, the voice signal received from the communication module 130, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (the particular one of the audio signal, the voice signal, or the combined signal output to the speaker 174) to the second AEC 203 and an AP pre-processing module 500 of the AP 120 so that the signal can be used as echo reference data for the echo signal cancelling.

The second AEC 203 may cancel an echo signal included in the microphone input signal based on the echo reference data (for example, the audio signal, the voice signal, or the combined signal) received from the audio combination module 200 for the voice call service.

According to an embodiment, the communication module 130 may provide the voice call service based on the microphone input signal, from which the echo signal is cancelled, received from the second AEC 203. For example, the communication module 130 may transmit the microphone input signal with echo cancellation that is received from the second AEC 203 to another electronic device that provides the voice call service.

The AP pre-processing module 500 of the AP 120 may cancel the echo signal included in the microphone input signal based on the echo reference data (for example, the audio signal, the voice signal, or the combined signal) received from the audio combination module 200. For example, the AP pre-processing module 500 may temporally synchronize the microphone input signal and the echo reference data (it is noted that there is an echo delay between the generation of the speaker output and the presence of the echo at the microphone. Therefore, "synchronize" it shall be understood to mean offsetting the reference data by the amount of the echo delay). The AP pre-processing module 500 may cancel the echo signal by using the synchronized microphone input signal and echo reference data to an extent that the voice signal included in the microphone input signal is not distorted or distortion is reduced to an acceptable level.

According to an embodiment, the AP 120 may drive an application based on the microphone input signal, from which the echo signal is cancelled using the AP pre-processing module 500.

According to an embodiment, the microphone input signal and the echo reference data may be transmitted to the AP 120 through independent signal paths (channels). For example, the audio processing module 170 may activate a plurality of microphone input routes with the AP 120 and transmit the echo reference data and the microphone input signal to the AP 120 through different routes (signal paths). For example, the audio processing module 170 may activate one microphone input route with the AP 120 and transmit the microphone input signal to the AP 120. The audio processing module 170 may transmit the echo reference data to the AP 120 through a route different from the microphone input route according to a predetermined period.

According to various embodiments of the present disclosure, the audio processing module 170 may transmit the echo reference data and the microphone input signal to the AP 120 by using one route. For example, the audio processing module 170 may transmit the echo reference data and the microphone input signal to the AP 120 through one route as illustrated in FIG. 6.

Figure 6:
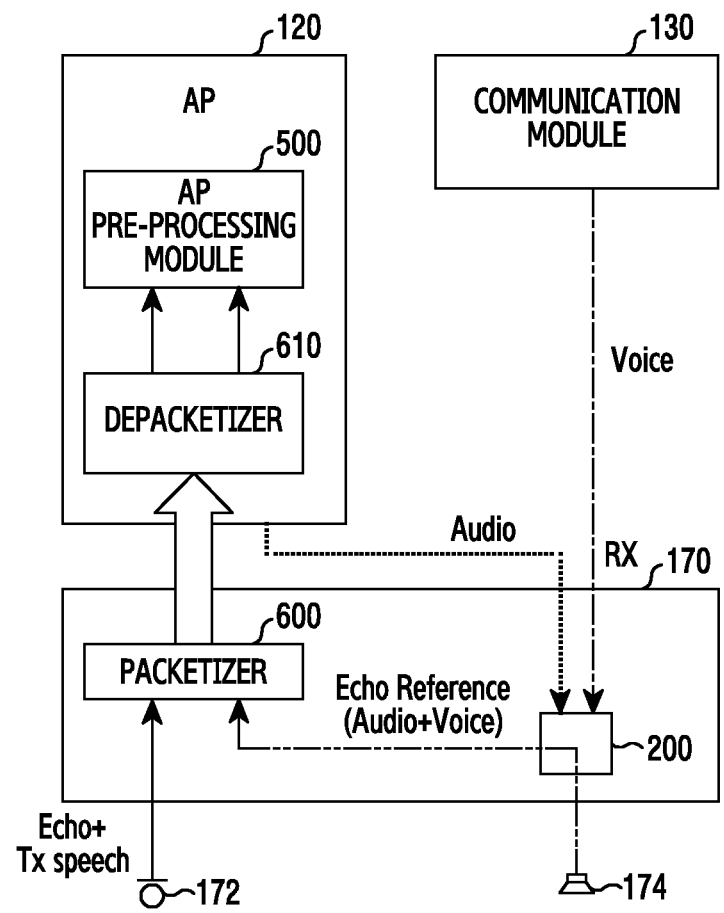
FIG. 6 illustrates a structure for transmitting an audio signal to the AP by the audio processing module according to various embodiments of the present disclosure.

FIG. 6 illustrates a structure for transmitting the audio signal to the AP by the audio processing module according to various embodiments of the present disclosure. Hereinafter, a structure for transmitting a signal by using channel structures of FIGS. 7A and 7B will be described.

Figure 7A:
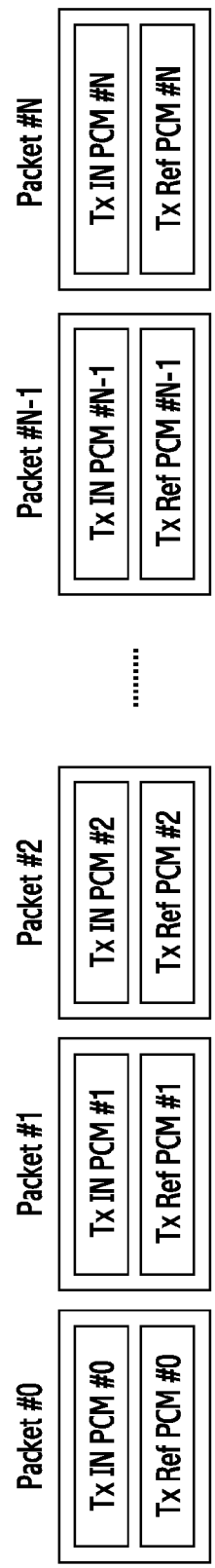
FIG. 7A and FIG. 7B illustrate channel structures for transmitting the audio signal to the AP according to various embodiments of the present disclosure.
Figure 7B:
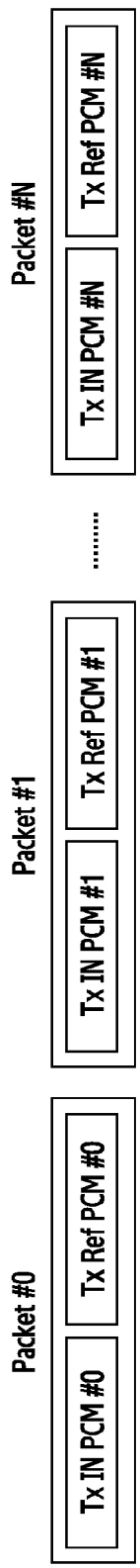

Referring to FIG. 6, the audio processing module 170 may convert the structure to a structure for transmitting the echo reference data and the microphone input signal to the AP 120 through one route by using a packetizer 600 (e.g., chunck module). For example, when the audio processing module 170 and the AP 120 are connected through a stereo channel, the packetizer 600 may generate packets (e.g., chunks) to include the microphone input signal (Tx IN PCM) in a first channel of the stereo channel and to include the echo reference data (Tx Ref PCM) in a second channel as illustrated in FIG. 7A. The term "packet" shall include packets with header or headerless packets. For example, when the audio processing module 170 and the AP 120 are connected through a mono channel, the chunk module 600 may generate packets to include the microphone input signal (Tx IN PCM) and the echo reference data (Tx Ref PCM) in the mono channel alternately at regular intervals as illustrated in FIG. 7B.

The packetizer 600 may transmit the packets including the echo reference data and the microphone input signal to the AP 120 through one route (channel).

The AP 120 may separate the echo reference data and the microphone input signal, which are received from the audio processing module 170, by using a depacketizer 610.

According to an embodiment, the AP pre-processing module 500 of the AP 120 may cancel the echo signal included in the microphone input signal based on the echo reference data separated by the depacketizer 610.

Figure 8:
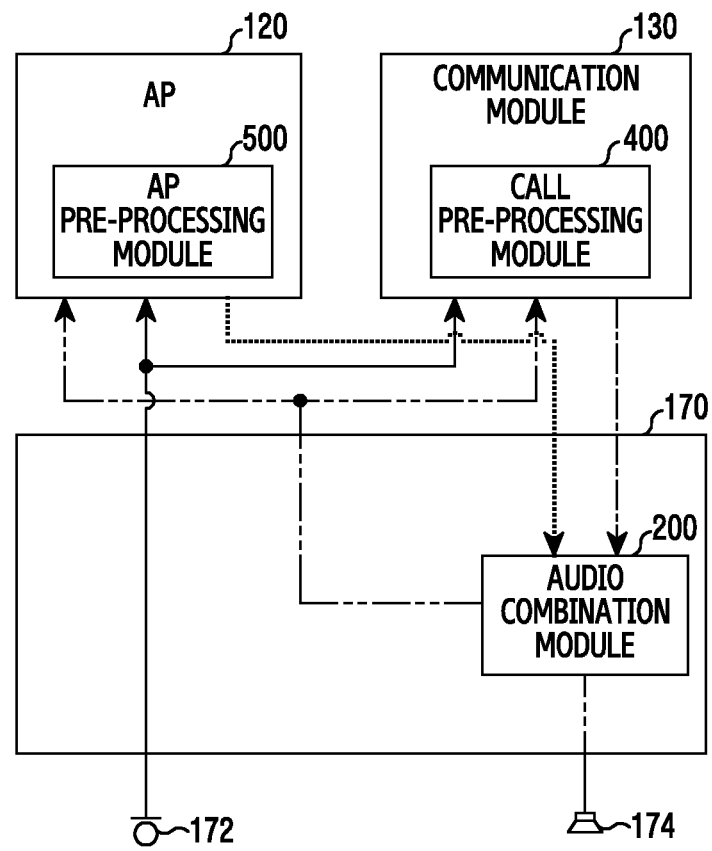
FIG. 8 illustrates a structure for cancelling the echo signal by using the AP and the communication module by the electronic device according to various embodiments of the present disclosure.

FIG. 8 illustrates a structure for cancelling the echo signal by using the AP and the communication module by the electronic device where both AECs are within pre-processing modules of the AP and communication module, according to various embodiments of the present disclosure. Hereinafter, a structure for cancelling an echo signal flowing in the electronic device of FIG. 1 through the microphone 172 will be described.

Referring to FIG. 8, the audio combination module 200 of the audio processing module 170 may output the audio signal received from the AP 120 through the speaker 174, the voice signal received from the communication module 130 through the speaker 174, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (the particular one of the audio signal, the voice signal, or the combined signal output to the speaker 174) to the AP 120 and the communication module 130 so that the signal can be used as echo reference data for the echo signal cancelling.

The AP pre-processing module 500 of the AP 120 may cancel the echo signal included in the microphone input signal based on the echo reference data (for example, the audio signal, the voice signal, or the combined signal) received from the audio combination module 200. For example, the AP pre-processing module 500 may temporally synchronize the microphone input signal and the echo reference data. The AP pre-processing module 500 may cancel the echo signal by using the synchronized microphone input signal and echo reference data to an extent that the voice signal included in the microphone input signal is not distorted or distortion is reduced to an acceptable level.

According to an embodiment, the AP 120 may drive an application based on the microphone input signal, from which the echo signal is cancelled using the AP pre-processing module 500.

The call pre-processing module 400 of the communication module 130 may cancel the echo signal included in the microphone input signal based on the echo reference data (for example, the audio signal, the voice signal, or the combined signal) received from the audio combination module 200. For example, the call pre-processing module 400 may temporally synchronize the microphone input signal and the echo reference data. The call pre-processing module 400 may cancel the echo signal included in the microphone input signal by using the synchronized microphone input signal and echo reference data.

According to an embodiment, the communication module 130 may provide the voice call service based on the microphone input signal, from which the echo signal is cancelled, by using the call pre-processing module 400.

Figure 9:
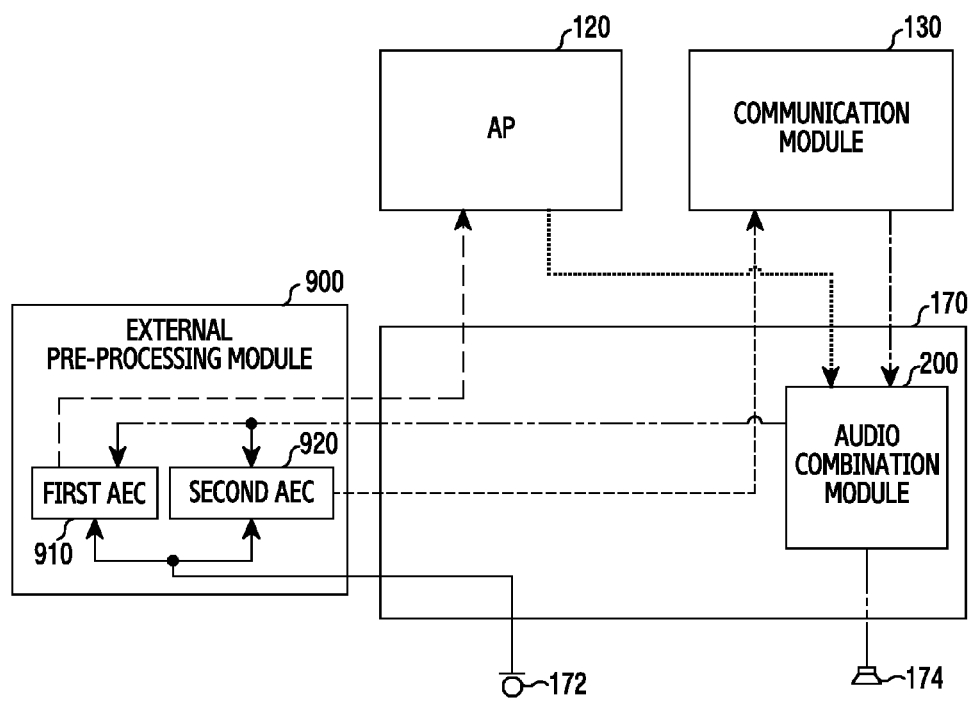
FIG. 9 illustrates a structure for cancelling the echo signal by using the external pre-processing module by the electronic device according to various embodiments of the present disclosure.

FIG. 9 illustrates a structure for cancelling the echo signal by using an external pre-processing module by the electronic device according to various embodiments of the present disclosure. Hereinafter, a structure for cancelling an echo signal flowing in the electronic device of FIG. 1 through the microphone 172 will be described.

Referring to FIG. 9, the audio combination module 200 of the audio processing module 170 may output the audio signal received from the AP 120 through the speaker 174, the voice signal received from the communication module 130 through the speaker 174, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (for example, the audio signal, the voice signal, or the combined signal) output to the speaker 174 to an external pre-processing module 900 so that the signal can be used as echo reference data for the echo signal cancelling.

According to an embodiment, the external pre-processing module 900 may include a first AEC 910 and a second AEC 920 for cancelling the echo signal flowing in through the microphone 172.

The first AEC 910 may cancel an echo signal included in the microphone input signal based on the echo reference data (for example, the audio signal, the voice signal, or the combined signal) received from the audio combination module 200 to drive an application of the AP 120. For example, when the AP 120 executes a voice recognition application, the first AEC 910 may cancel the echo signal to increase a voice recognition rate of the AP 120 to an extent that the voice signal included in the microphone input signal is not distorted.

According to an embodiment, the first AEC 910 may transmit the microphone input signal, from which the echo signal is cancelled, to the AP 120 through the audio processing module 170.

According to an embodiment, the AP 120 may execute an application based on the microphone input signal, from which the echo signal is cancelled, received from the audio processing module 170.

The second AEC 920 may cancel an echo signal included in the microphone input signal, independently from the first AEC 910, to optimize the microphone input signal for the voice call service based on the echo reference data (for example, the audio signal, the voice signal, or the combined signal) received from the audio combination module 200 for the voice call service of the communication module 130. For example, an echo signal cancelling level (for example, echo signal cancelling intensity) of the second AEC 920 may be set to be higher than an echo signal cancelling level of the first AEC 910.

According to an embodiment, the second AEC 920 may transmit the microphone input signal, from which the echo signal is cancelled, to the AP 120 through the audio processing module 170.

According to an embodiment, the communication module 130 may provide the voice call service based on the microphone input signal, from which the echo signal is cancelled, received from the audio processing module 170.

In FIG. 9, the external pre-processing module 900 may include the first AEC 910 for the AP 120 and the second AEC 920 for the communication module 130.

According to various embodiments of the present disclosure, the external pre-processing module 900 may selectively cancel the echo signal for the AP 120 and the echo signal for the communication module 130 by using one AEC. For example, when an application is executed using the AP 120, the AEC of the external pre-processing module 900 may cancel the echo signal at an echo signal cancelling level corresponding to the AP 120. For example, when the voice call service is provided using the communication module 130, the AEC of the external pre-processing module 900 may cancel the echo signal at an echo signal cancelling level corresponding to the communication module 130.

Figure 10:
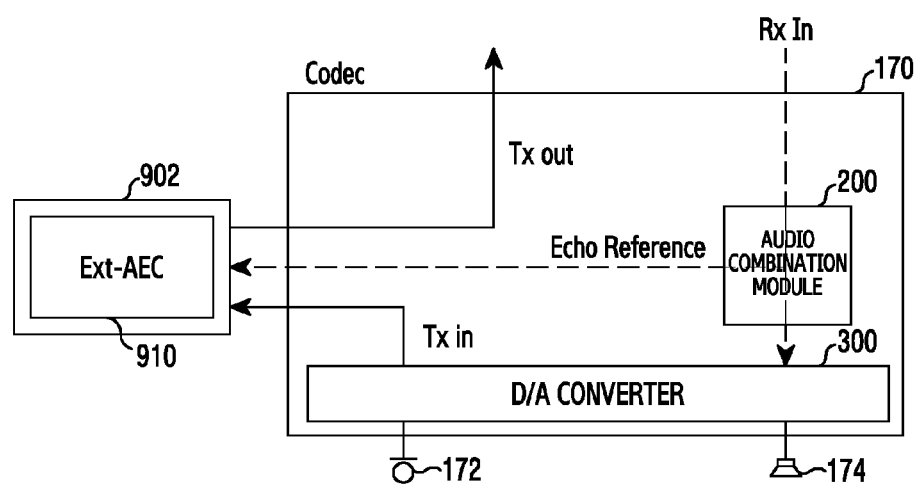
FIG. 10 is a detailed block diagram of the external pre-processing module according to various embodiments of the present disclosure.

FIG. 10 is a detailed block diagram of the external pre-processing module according to various embodiments of the present disclosure. Hereinafter, a detailed configuration of the external pre-processing module 900 for cancelling the echo signal as illustrated in FIG. 9 will be described.

Referring to FIG. 10, the audio combination module 200 of the audio processing module 170 may combine the audio signal received from the AP 120 and the voice signal received from the communication module 130 into one signal.

According to an embodiment, the audio combination module 200 may transmit the combined signal to the external pre-processing module 900 so that the signal can be used as echo reference data for echo signal cancelling.

The D/A converter 300 may convert a digital signal into an analog signal or an analog signal into a digital signal. For example, the D/A converter 300 may convert a digital signal received from the audio combination module 200 into an analog signal which can be output through the speaker 174. For example, the D/A converter 300 may convert an analog signal input through the microphone 172 into a digital signal which can be processed by the audio processing module 170.

According to an embodiment, the audio processing module 170 may transmit the digital signal converted by the D/A converter 300 to the external pre-processing module 900. For example, when the echo signal is cancelled based on a control of at least one of the AP 120 and the communication module 130, the audio processing module 170 may transmit the digital signal converted by the D/A converter 300 to the external pre-processing module 900.

The AEC 910 or 920 of the external pre-processing module 900 may cancel the echo signal included in the microphone input signal based on echo reference data (for example, the signal output through the speaker 174) received from the audio combination module 170.

The external pre-processing module 900 may transmit the microphone input signal, from which the echo signal is cancelled, to the AP 120 or the communication module 130 through the audio processing module 170.

Figure 11:
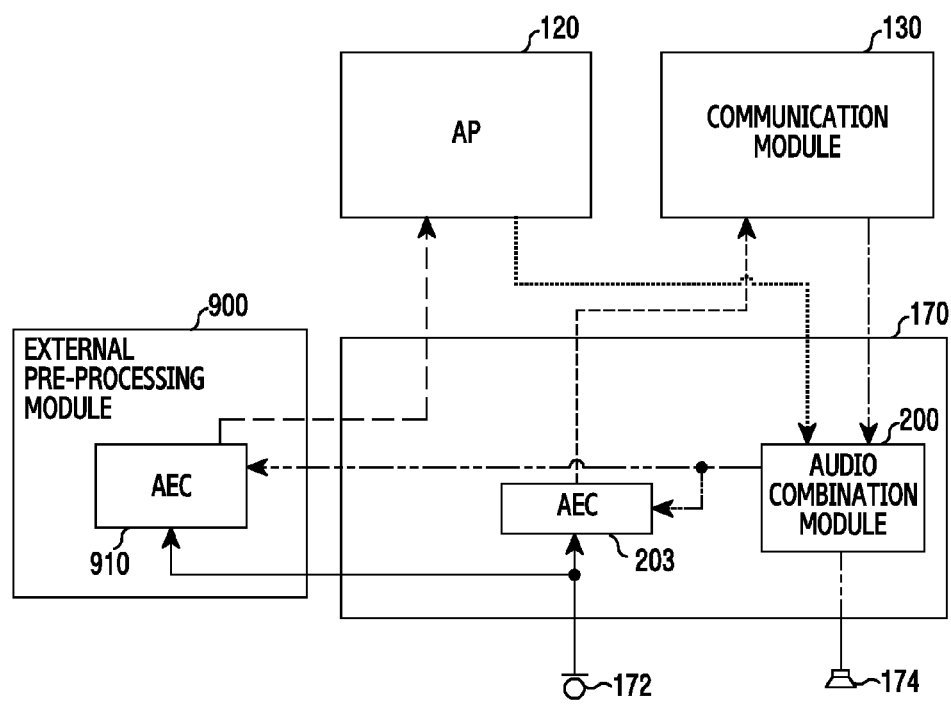
FIG. 11 illustrates a structure for cancelling the echo signal by using the external pre-processing module and the audio processing module by the electronic device according to various embodiments of the present disclosure.

FIG. 11 illustrates a structure for cancelling the echo signal by using the external pre-processing module and the audio processing module by the electronic device, wherein the AEC for the AP is located in the external pre-processing module according to various embodiments of the present disclosure. Hereinafter, a structure for cancelling an echo signal flowing in the electronic device of FIG. 1 through the microphone 172 will be described.

Referring to FIG. 11, the audio combination module 200 of the audio processing module 170 may output the audio signal received from the AP 120 through the speaker 174, the voice signal received from the communication module 130 through the speaker 174, or a combined signal through the speaker. For example, the audio combination module 200 may combine the audio signal received from the AP 120 and the voice signal received from the communication module 130 into one signal and output the signal through the speaker 174.

According to an embodiment, the audio combination module 200 may transmit the signal (the particular one of the audio signal, the voice signal, or the combined signal output to the speaker 174) to the external pre-processing module 900 and the second AEC 203 so that the signal can be used as echo reference data for the echo signal cancelling.

The second AEC 203 may cancel an echo signal included in the microphone input signal based on the echo reference data (for example, the audio signal, the voice signal, or the combined signal) received from the audio combination module 200 for the voice call service of the communication module 130.

According to an embodiment, the communication module 130 may provide the voice call service based on the microphone input signal, from which the echo signal is cancelled, received from the second AEC 203.

The first AEC 910 of the external pre-processing module 900 may cancel an echo signal included in the microphone input signal based on the echo reference data (for example, the audio signal, the voice signal, or the combined signal) received from the audio combination module 200 to execute an application of the AP 120.

According to an embodiment, the first AEC 910 may transmit the microphone input signal, from which the echo signal is cancelled, to the AP 120 through the audio processing module 170.

According to an embodiment, the AP 120 may execute an application based on the microphone input signal, from which the echo signal is cancelled, received from the audio processing module 170.

Figure 12:
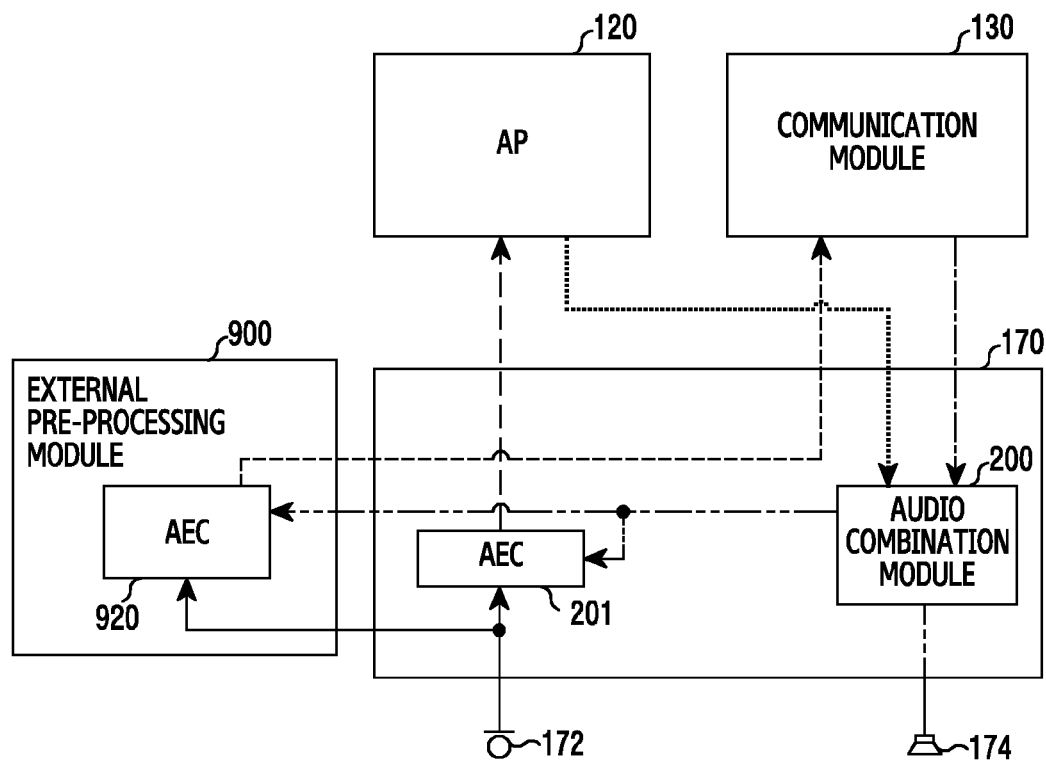
FIG. 12 illustrates a structure for cancelling the echo signal by using the external pre-processing module and the audio processing module by the electronic device according to various embodiments of the present disclosure.

FIG. 12 illustrates a structure for cancelling the echo signal by using the external pre-processing module and the audio processing module by the electronic device wherein the AEC for the communication module is located at the external pre-processing module according to various embodiments of the present disclosure. Hereinafter, a structure for cancelling an echo signal flowing in the electronic device of FIG. 1 through the microphone 172 will be described.

Referring to FIG. 12, the audio combination module 200 of the audio processing module 170 may output the audio signal received from the AP 120 through the speaker 174, the voice signal received from the communication module 130 through the speaker 174, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (the particular one of the audio signal, the voice signal, or the combined signal output to the speaker 174) to the external pre-processing module 900 and the first AEC 201 so that the signal can be used as echo reference data for the echo signal cancelling.

The first AEC 201 may cancel an echo signal included in the microphone input signal based on the echo reference data (for example, the audio signal, the voice signal, or the combined signal) received from the audio combination module 200 to drive an application of the AP 120.

According to an embodiment, the AP 120 may drive an application based on the microphone input signal, from which the echo signal is cancelled, received from the first AEC 201.

The second AEC 920 of the external pre-processing module 900 may cancel the echo signal included in the microphone input signal based on the echo reference data (for example, the audio signal, the voice signal, or the combined signal) received from the audio combination module 200 for the voice call service of the communication module 130.

According to an embodiment, the second AEC 920 may transmit the microphone input signal, from which the echo signal is cancelled, to the communication module 130 through the audio processing module 170.

According to an embodiment, the communication module 130 may provide the voice call service based on the microphone input signal, from which the echo signal is cancelled, received from the audio processing module 170.

Figure 13:
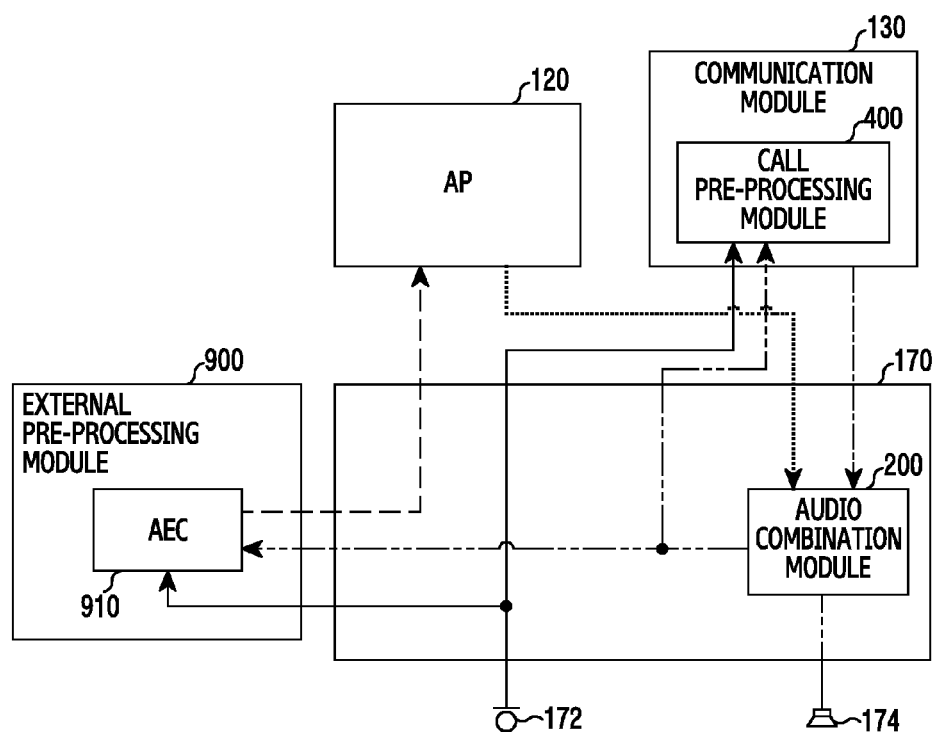
FIG. 13 illustrates a structure for cancelling the echo signal by using the external pre-processing module and the communication module by the electronic device according to various embodiments of the present disclosure.

FIG. 13 illustrates a structure for cancelling the echo signal by using the external pre-processing module and the communication module by the electronic device according to various embodiments of the present disclosure. Hereinafter, a structure for cancelling an echo signal flowing in the electronic device of FIG. 1 through the microphone 172 will be described.

Referring to FIG. 13, the audio combination module 200 of the audio processing module 170 may output the audio signal received from the AP 120 through the speaker 174, the voice signal received from the communication module 130 through the speaker 174, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (the particular one of the audio signal, the voice signal, or the combined signal output to the speaker 174) to the external pre-processing module 900 and the communication module 130 so that the signal can be used as echo reference data for the echo signal cancelling.

The call pre-processing module 400 of the communication module 130 may cancel the echo signal included in the microphone input signal based on the echo reference data (for example, the audio signal, the voice signal, or the combined signal) received from the audio combination module 200 for the voice call service of the communication module 130.

According to an embodiment, the communication module 130 may provide the voice call service based on the microphone input signal, from which the echo signal is cancelled, by using the call pre-processing module 400.

The first AEC 910 of the external pre-processing module 900 may cancel an echo signal included in the microphone input signal based on the echo reference data (for example, the audio signal, the voice signal, or the combined signal) received from the audio combination module 200 to execute an application of the AP 120.

According to an embodiment, the first AEC 910 may transmit the microphone input signal, from which the echo signal is cancelled, to the AP 120 through the audio processing module 170.

According to an embodiment, the AP 120 may execute an application based on the microphone input signal, from which the echo signal is cancelled, received from the audio processing module 170.

Figure 14:
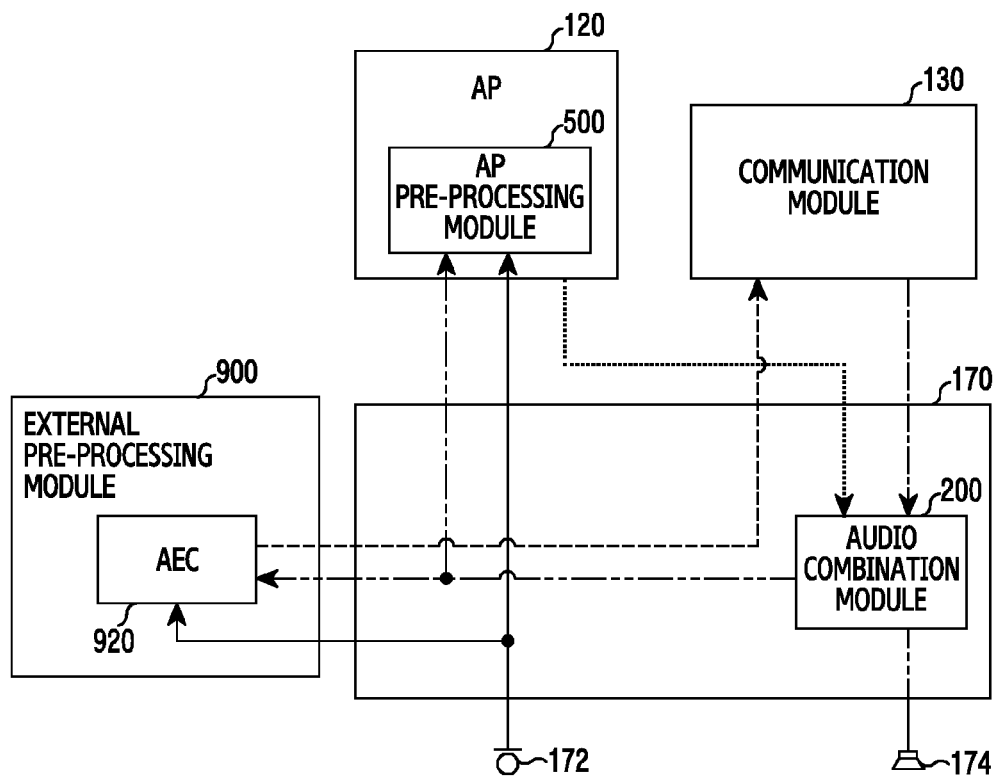
FIG. 14 illustrates a structure for cancelling the echo signal by using the external pre-processing module and the AP by the electronic device according to various embodiments of the present disclosure.

FIG. 14 illustrates a structure for cancelling the echo signal by using the external pre-processing module and the AP by the electronic device according to various embodiments of the present disclosure. Hereinafter, a structure for cancelling an echo signal flowing in the electronic device of FIG. 1 through the microphone 172 will be described.

Referring to FIG. 14, the audio combination module 200 of the audio processing module 170 may output the audio signal received from the AP 120 through the speaker 174, the voice signal received from the communication module 130 through the speaker 174, or a combined signal through the speaker 174. For example, the audio combination module 200 may combine the audio signal received from the AP 120 and the voice signal received from the communication module 130 into one signal and output the signal through the speaker 174.

According to an embodiment, the audio combination module 200 may transmit the signal (the particular one of the audio signal, the voice signal, or the combined signal output to the speaker 174) to the external pre-processing module 900 and the AP 120 so that the signal can be used as echo reference data for the echo signal cancelling.

The AP pre-processing module 500 of the AP 120 may cancel the echo signal included in the microphone input signal based on the echo reference data (for example, the audio signal, the voice signal, or the combined signal) received from the audio combination module 200.

According to an embodiment, the audio processing module 170 may transmit the echo reference data and the microphone input signal to the AP 120 through at least one route (channel). For example, the audio processing module 170 may transmit the echo reference data and the microphone input signal to the AP 120 through independent routes (channels). For example, the audio processing module 170 may transmit data in a structure including the echo reference data and the microphone input signal to the AP 120 through one path or channel.

According to an embodiment, the AP 120 may drive an application based on the microphone input signal, from which the echo signal is cancelled using the AP pre-processing module 500.

The second AEC 920 of the external pre-processing module 900 may cancel the echo signal included in the microphone input signal based on the echo reference data (for example, the combined signal) received from the audio combination module 200 for the voice call service of the communication module 130.

According to an embodiment, the second AEC 920 may transmit the microphone input signal, from which the echo signal is cancelled, to the communication module 130 through the audio processing module 170.

According to an embodiment, the communication module 130 may provide the voice call service based on the microphone input signal, from which the echo signal is cancelled, received from the audio processing module 170.

According to various embodiments of the present disclosure, the electronic device 100 may be configured to cancel the echo signal by using the AEC 201 or 203 (or both) of the audio processing module 170 and the AEC 910 or 920 of the external pre-processing module 900.

Figure 15:
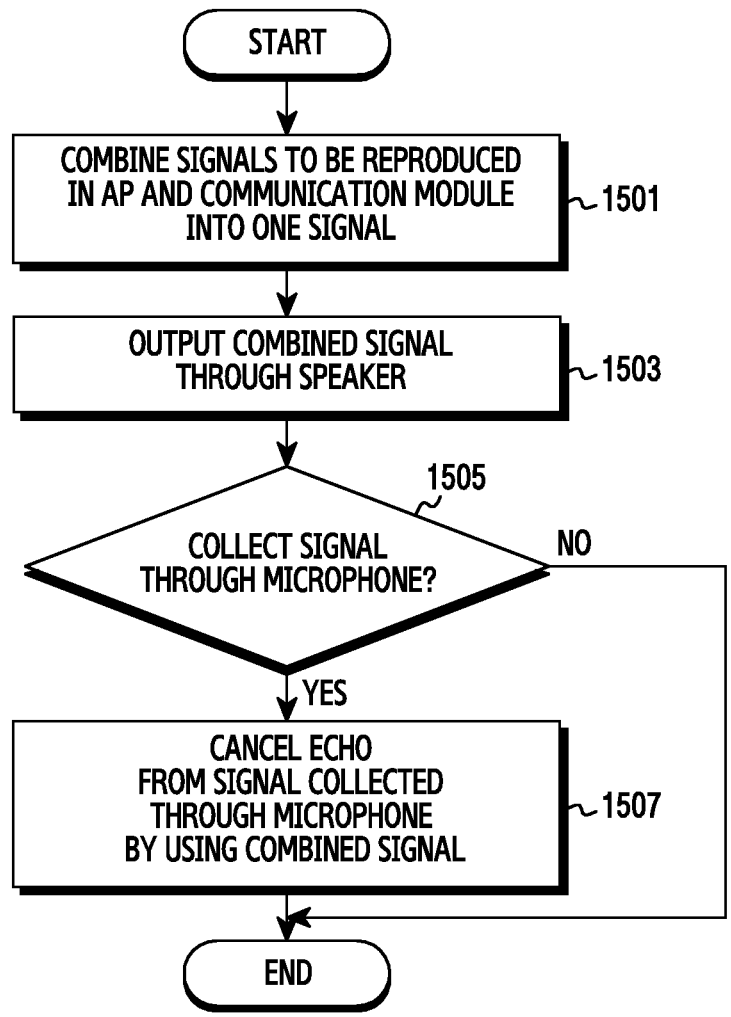
FIG. 15 is a flowchart illustrating an operation for cancelling the echo signal by the electronic device according to various embodiments of the present disclosure.

FIG. 15 is a flowchart illustrating an operation for cancelling the echo signal by the electronic device according to various embodiments of the present disclosure.

Referring to FIG. 15, in operation 1501, the electronic device (for example, the electronic device 100 of FIG. 1) may combine signals to be reproduced by the AP (for example, the AP 120) and the communication module (for example, the communication module 130) into one signal. For example, the electronic device 100 may combine the audio signal (for example, TTS, key tone, effect sound, or the like) received from the AP 120 and the voice signal (for example, counterpart's call voice signal) received from the communication module 130 into one signal through the audio combination module 200 of the audio processing module 170.

In operation 1503, the electronic device may output the signal combined in operation 1501 through the speaker (for example, the speaker 174). It shall be understood that outputting a signal by a first entity to a second entity does not necessarily require direct transmission from the first entity to the second entity and may include, for example, a D/A converter.

In operation 1505, the electronic device may identify whether the signal is collected through the microphone (for example, the microphone 172). For example, the electronic device 100 may identify whether the signal flows in through the microphone 172.

When the signal is collected through microphone, the electronic device may cancel the echo from the microphone input signal based on the combined signal (for example, the signal output through the speaker) in operation 1507. For example, the AEC 201, 500, or 910 for the AP 120 of the electronic device 100 may cancel the echo signal for the AP 120 based on the echo reference data (for example, the signal output through the speaker). For example, the AEC 201, 500, or 910 for the AP 120 may cancel the echo signal based on a control of the AP 120. For example, the AEC 203, 400, or 920 for the communication module 130 of the electronic device 100 may cancel the echo signal for the communication module 130 based on the echo reference data (for example, the signal output through the speaker). For example, the AEC 203, 400, or 920 for the communication module 130 may cancel the echo signal based on a control of the communication module 130.

According to various embodiments of the present disclosure, when the audio signal or the voice signal is generated from one element between the AP 120 and the communication module 130, the electronic device 100 may omit the combination process using the audio combination module 200. In this case, the electronic device 100 may set the audio signal or the voice signal generated from one element as the echo reference data.

Figure 16:
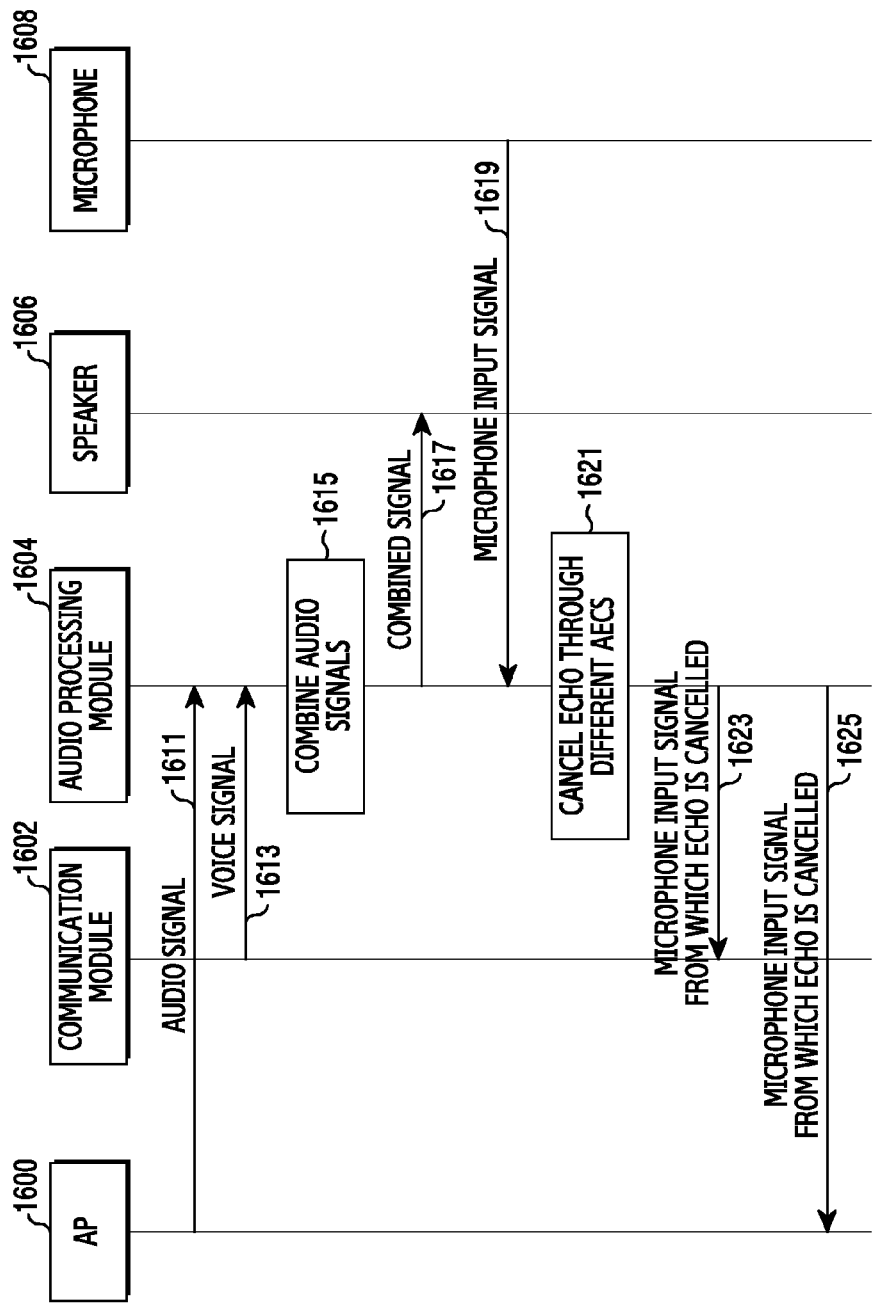
FIG. 16 is a signal flowchart illustrating an operation for cancelling the echo signal by using the audio processing module by the electronic device according to various embodiments of the present disclosure.

FIG. 16 is a signal flowchart illustrating an operation for cancelling the echo signal by using the audio processing module by the electronic device according to various embodiments of the present disclosure. Hereinafter, signal flows between the elements of the electronic device 100 to cancel the echo signal will be described.

Referring to FIG. 16, an AP 1600 (for example, the AP 120) may transmit an audio signal (for example, TTS, key tone, effect sound, or the like) corresponding to driving of an application program to an audio processing module 1604 (for example, the audio processing module 170) in operation 1611.

A communication module 1602 (for example, the communication module 130) may transmit a voice signal (for example, a counterpart's call voice signal) for a voice call service to the audio processing module 1604 in operation 1613.

The audio processing module 1604 may combine the audio signal received from the AP 1600 and the voice signal received from the communication module 1602 into one signal in operation 1615. For example, the audio processing module 1604 may combine the audio signal received from the AP 1600 and the voice signal received from the communication module 1602 into one signal by using the audio combination module 200.

The audio processing module 1604 may output the combined signal to the outside through a speaker 1606 (for example, the speaker 174) in operation 1617.

The audio processing module 1604 may collect sound signals through a microphone 1608 (for example, the microphone 172) in operation 1619. For example, the sound signals collected through the microphone 1608 may include signals (for example, the audio signal and the voice signal) for providing a service of the electronic device 100 and the signal (echo signal) output through the speaker 1606.

The audio processing module 1604 may cancel the echo signal included in the microphone input signal by using the combined signal as echo reference data in operation 1621. For example, in FIG. 2, the first AEC 201 of the audio processing module 1604 may cancel the echo signal based on the echo reference data to execute an application to an extent that the voice signal included in the microphone input signal is not distorted. For example, in FIG. 2, the second AEC 203 of the audio processing module 1604 may cancel the echo signal included in the microphone input signal based on the echo reference data for the voice call service.

The audio processing module 1604 may transmit the microphone input signal, from which the echo signal is cancelled, to the AP 1600 and the communication module 1602 in operations 1623 and 1625. For example, the audio processing module 1604 may transmit the microphone input signal, from which the echo signal is cancelled, to the AP 1600 through the first AEC 201 in operation 1623. For example, the audio processing module 1604 may transmit the microphone input signal, from which the echo signal is cancelled, to the communication module 1602 through the second AEC 203 in operation 1625. It is noted that the transmission during operation 1623 from the audio processing module 1604 to the communication module 1602 may be different from the transmission during operation 1625 from the audio processing module 1604 to the application processor 1600.

Figure 17:
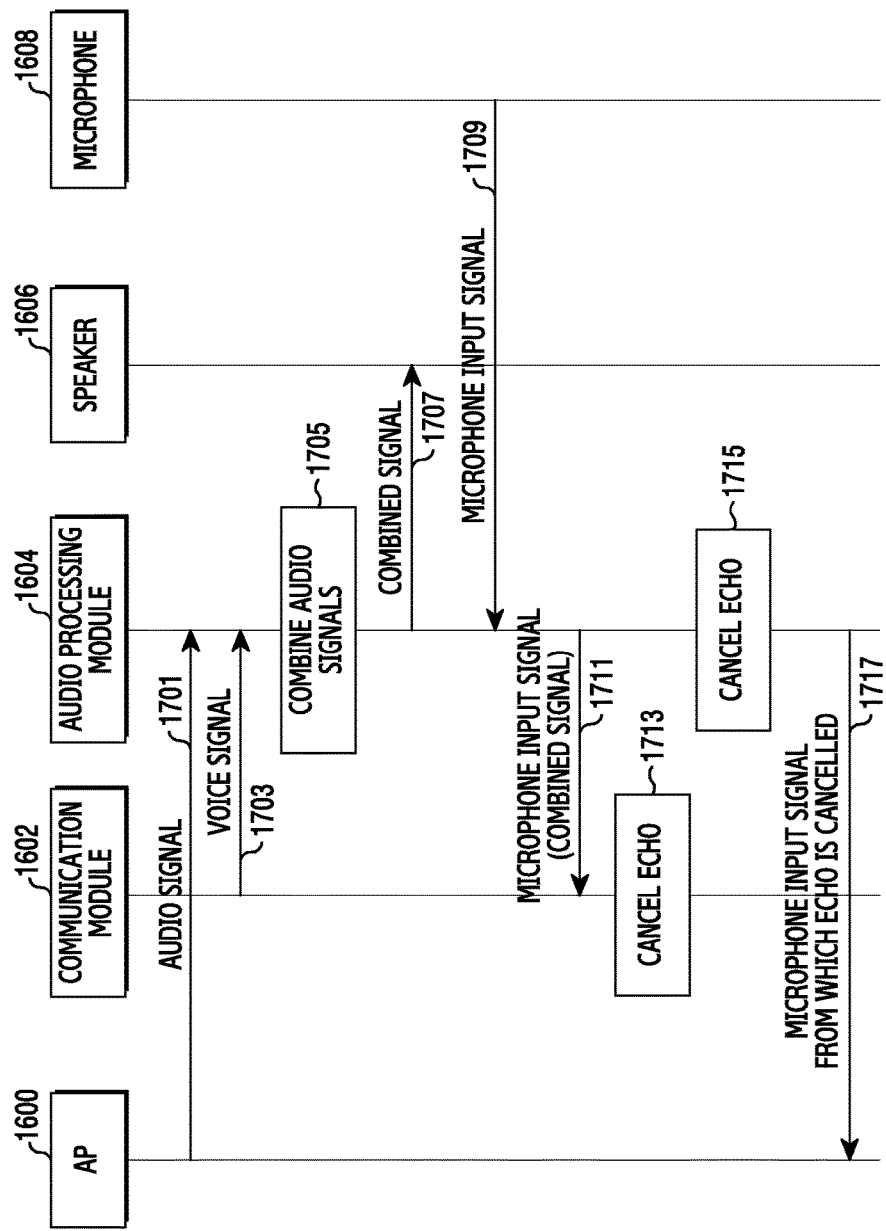
FIG. 17 is a signal flowchart illustrating an operation for cancelling the echo signal by using the audio processing module and the communication module by the electronic device according to various embodiments of the present disclosure.

FIG. 17 is a signal flowchart illustrating an operation for cancelling the echo signal by using the audio processing module and the communication module by the electronic device according to various embodiments of the present disclosure. Hereinafter, signal flows between the elements of the electronic device 100 to cancel the echo signal will be described.

Referring to FIG. 17, the AP 1600 (for example, the AP 120) may transmit an audio signal corresponding to driving of an application program to the audio processing module 1604 (for example, the audio processing module 170) in operation 1701.

The communication module 1602 (for example, the communication module 130) may transmit a voice signal for a voice call service to the audio processing module 1604 in operation 1703.

The audio processing module 1604 may combine the audio signal received from the AP 1600 and the voice signal received from the communication module 1602 into one signal in operation 1705.

The audio processing module 1604 may output the signal combined by the audio combination module 200 to the outside through the speaker 1606 (for example, the speaker 174) in operation 1707.

The audio processing module 1604 may receive sound signals through the microphone 1608 (for example, the microphone 172).

The audio processing module 1604 may transmit the combined signal to be used as echo reference data and the microphone input signal to the communication module 1602 in operation 1711. For example, the audio processing module 1604 may transmit the echo reference data and the microphone input signal to the communication module 1602 through at least one path (channel). For example, the audio processing module 1604 may transmit the echo reference data and the microphone input signal to the communication module 1602 through independent paths (channels). For example, the audio processing module 1604 may generate data (for example, a packet) in a structure including the echo reference data and the microphone input signal and transmit the data to the communication module 1602 through one path.

The communication module 1602 may cancel the echo signal included in the microphone input signal based on the echo reference data received from the audio processing module 1604 in operation 1713. For example, the call pre-processing module 400 of the communication module

1602 may cancel the echo signal included in the microphone input signal based on the echo reference data (for example, the combined signal) received from the audio combination module 1604 for the voice call service as illustrated in FIG. 4.

The audio processing module 1604 may cancel the echo signal included in the microphone input signal by using the combined signal as the echo reference data to execute the application of the AP 1600 in operation 1715. For example, the first AEC 201 of the audio processing module 1604 may cancel the echo signal included in the microphone input signal based on the echo reference data to execute the application as illustrated in FIG. 4.

The audio processing module 1604 may transmit the microphone input signal, from which the echo signal is cancelled, to the AP 1600 in operation 1717. For example, the audio processing module 1604 may transmit the microphone input signal, from which the echo signal is cancelled, to the AP 1600 through the first AEC 201.

Figure 18:
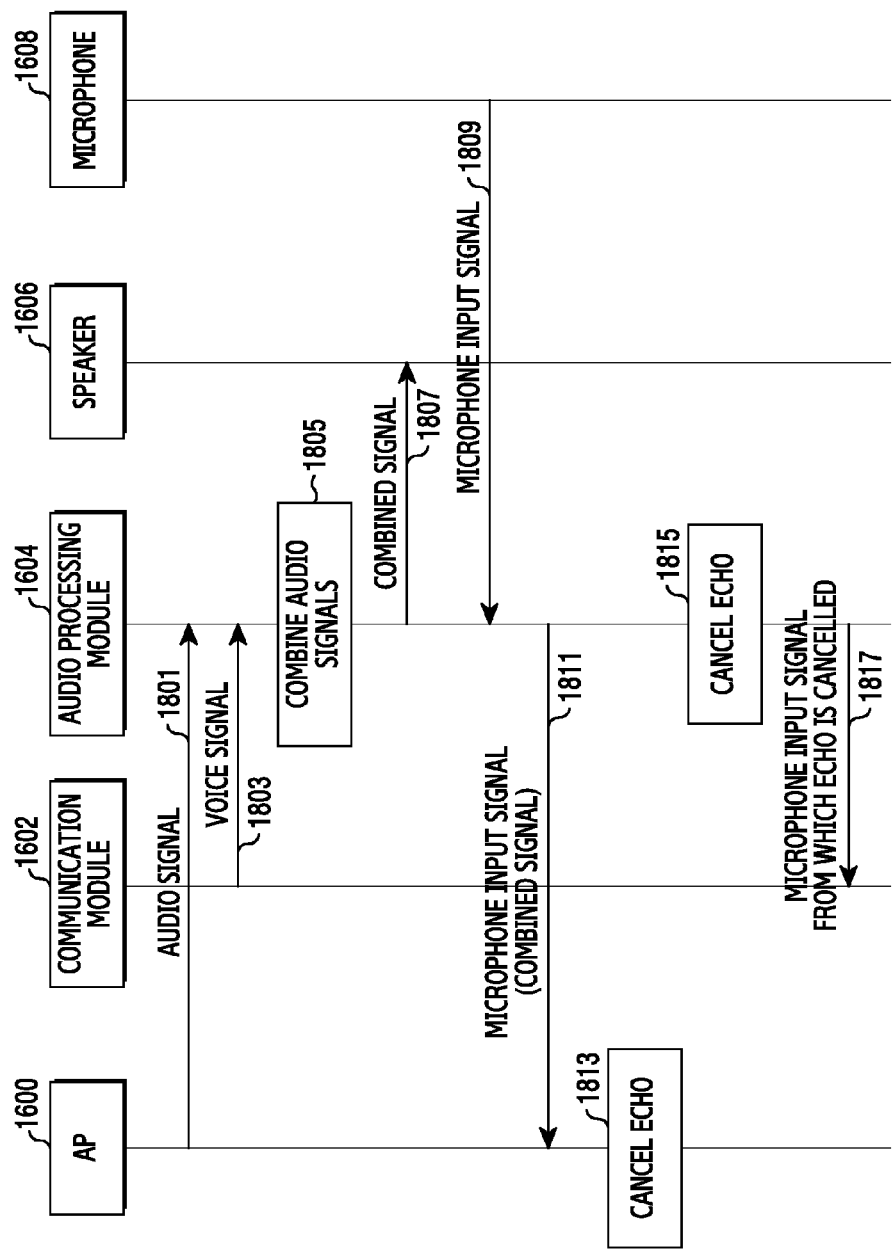
FIG. 18 is a signal flowchart illustrating an operation for cancelling the echo signal by using the audio processing module and the AP by the electronic device according to various embodiments of the present disclosure.

FIG. 18 is a signal flowchart illustrating an operation for cancelling the echo signal by using the audio processing module and the AP by the electronic device according to various embodiments of the present disclosure. Hereinafter, signal flows between the elements of the electronic device 100 to cancel the echo signal will be described.

Referring to FIG. 18, the AP 1600 (for example, the AP 120) may transmit an audio signal corresponding to driving of an application program to the audio processing module 1604 (for example, the audio processing module 170) in operation 1801.

The communication module 1602 (for example, the communication module 130) may transmit a voice signal for a voice call service to the audio processing module 1604 in operation 1803.

The audio processing module 1604 may combine the audio signal received from the AP 1600 and the voice signal received from the communication module 1602 into one signal in operation 1805.

The audio processing module 1604 may output the signal combined by the audio combination module 200 to the outside through the speaker 1606 (for example, the speaker 174) in operation 1807.

The audio processing module 1604 may receive sound signals through the microphone 1608 (for example, the microphone 172) in operation 1809.

The audio processing module 1604 may transmit the combined signal to be used as echo reference data and the microphone input signal to the AP 1600 in operation 1811. For example, the audio processing module 1604 may transmit the echo reference data and the microphone input signal to the AP 1600 through at least one path (channel). For example, the audio processing module 1604 may transmit the echo reference data and the microphone input signal to the AP 1600 through independent paths (channels). For example, the audio processing module 1604 may generate data (for example, a packet) in a structure including the echo reference data and the microphone input signal and transmit the data to the AP 1600 through one path as illustrated in FIG. 6.

The AP 1600 may cancel the echo signal included in the microphone input signal based on the echo reference data received from the audio processing module 1604 in operation 1813. For example, the AP pre-processing module 500 of the AP 1600 may cancel the echo signal included in the microphone input signal based on the echo reference data (for example, the combined signal) received from the audio combination module 1604 to execute the application of the AP 120 as illustrated in FIG. 5.

The audio processing module 1604 may cancel the echo signal included in the microphone input signal by using the combined signal as the echo reference data for the voice call service of the communication module 130 in operation 1815. For example, the second AEC 203 of the audio processing module 1604 may cancel the echo signal included in the microphone input signal based on the echo reference data to provide the voice call service as illustrated in FIG. 5.

The audio processing module 1604 may transmit the microphone input signal, from which the echo signal is cancelled, to the communication module 1602 in operation 1817. For example, the audio processing module 1604 may transmit the microphone input signal, from which the echo signal is cancelled, to the communication module 1602 through the second AEC 203.

Figure 19:
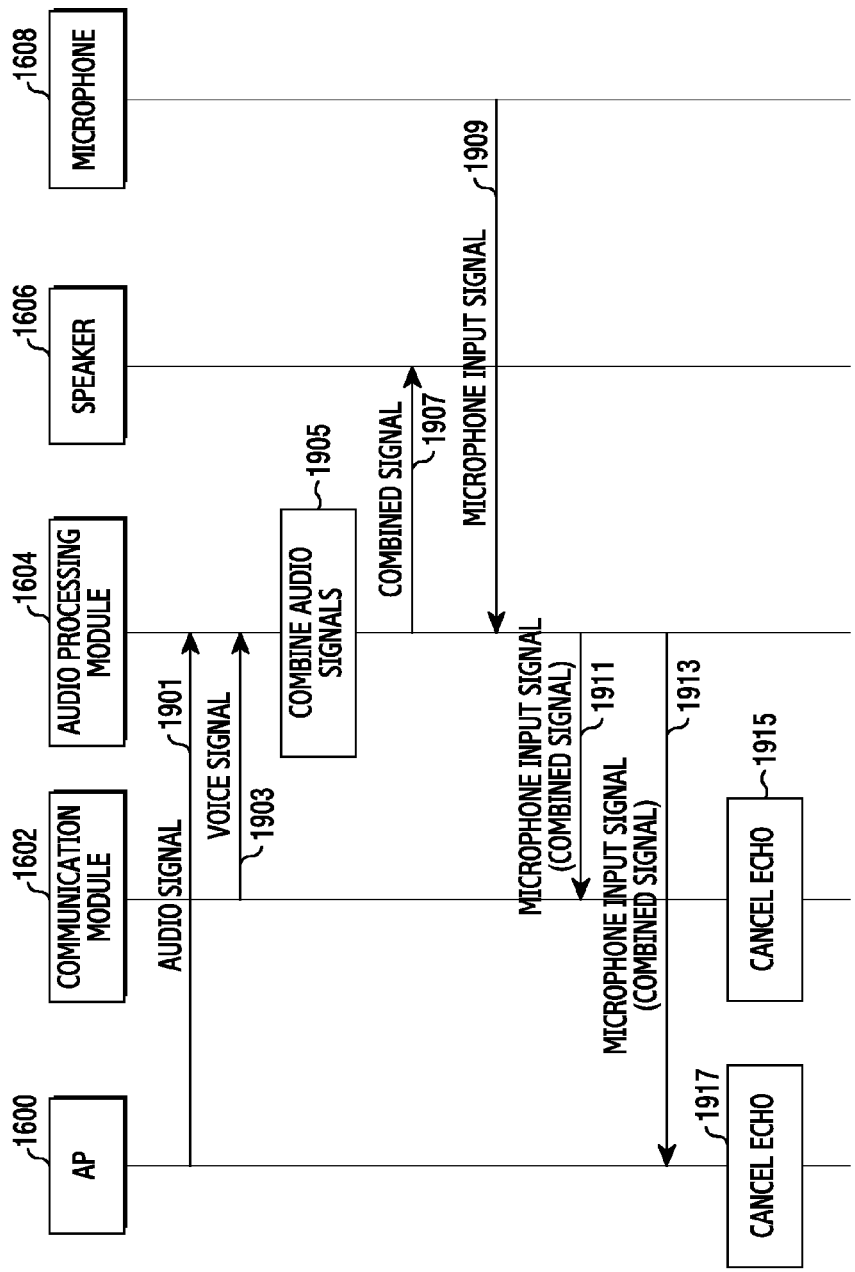
FIG. 19 is a signal flowchart illustrating an operation for canceling the echo signal by using the AP and the communication module by the electronic device according to various embodiments of the present disclosure.

FIG. 19 is a signal flowchart illustrating an operation for canceling the echo signal by using the AP and the communication module by the electronic device according to various embodiments of the present disclosure. Hereinafter, signal flows between the elements of the electronic device 100 to cancel the echo signal will be described.

Referring to FIG. 19, the AP 1600 (for example, the AP 120) may transmit an audio signal corresponding to driving of an application program to the audio processing module 1604 (for example, the audio processing module 170) in operation 1901.

The communication module 1602 (for example, the communication module 130) may transmit a voice signal for a voice call service to the audio processing module 1604 in operation 1903.

The audio processing module 1604 may combine the audio signal received from the AP 1600 and the voice signal received from the communication module 1602 into one signal in operation 1905.

The audio processing module 1604 may output the signal combined by the audio combination module 200 to the outside through the speaker 1606 (for example, the speaker 174) in operation 1907.

The audio processing module 1604 may receive sound signals through the microphone 1608 (for example, the microphone 172) in operation 1909.

The audio processing module 1604 may transmit the combined signal to be used as echo reference data and the microphone input signal to the AP 1600 and the communication module 1602 in operations 1911 and 1913.

The communication module 1602 may cancel the echo signal included in the microphone input signal based on the echo reference data received from the audio processing module 1604 in operation 1915. For example, the call pre-processing module 400 of the communication module 1602 may cancel the echo signal included in the microphone input signal based on the echo reference data (for example, the combined signal) received from the audio combination module 1604 for the voice call service as illustrated in FIG. 8.

The AP 1600 may cancel the echo signal included in the microphone input signal based on the echo reference data received from the audio processing module 1604 in operation 1917. For example, the AP pre-processing module 500 of the AP 1600 may cancel the echo signal included in the microphone input signal based on the echo reference data (for example, the combined signal) received from the audio combination module 1604 to execute the application of the AP 1600 as illustrated in FIG. 8.

Figure 20:
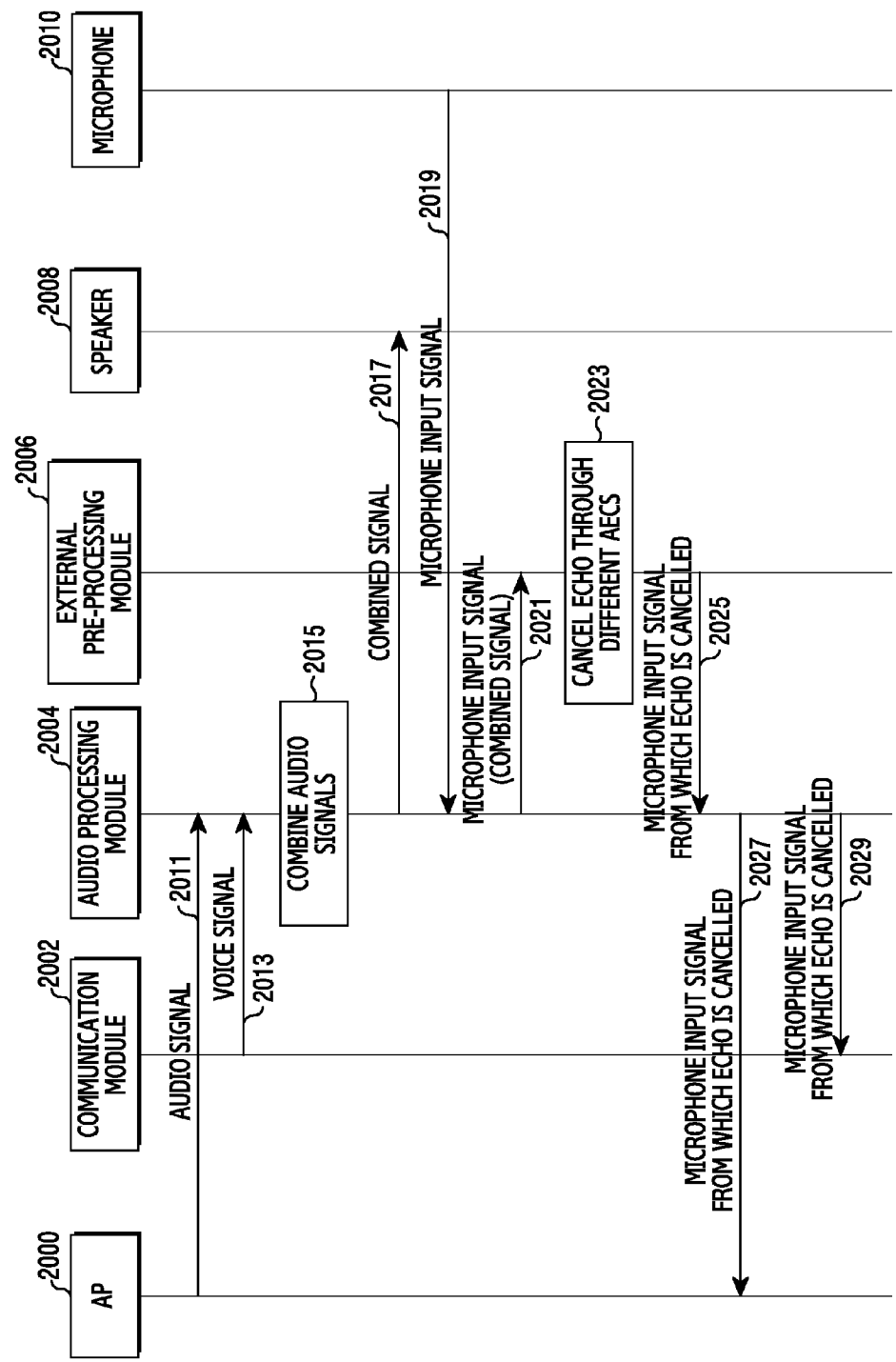
FIG. 20 is a signal flowchart illustrating an operation for cancelling the echo signal by using the external pre-processing module by the electronic device according to various embodiments of the present disclosure.

FIG. 20 is a signal flowchart illustrating an operation of cancelling the echo signal by using the external pre-processing module by the electronic device according to various embodiments of the present disclosure. Hereinafter, signal flows between the elements of the electronic device 100 to cancel the echo signal will be described.

Referring to FIG. 20, an AP 2000 (for example, the AP 120) may transmit an audio signal corresponding to driving of an application program to an audio processing module 2004 (for example, the audio processing module 170) in operation 2011.

A communication module 2002 (for example, the communication module 130) may transmit a voice signal for a voice call service to the audio processing module 2004 in operation 2013.

The audio processing module 2004 may combine the audio signal received from the AP 2000 and the voice signal received from the communication module 2002 into one signal in operation 2015.

The audio processing module 2004 may output the signal combined by the audio combination module 200 to the outside through a speaker 2008 (for example, the speaker 174) in operation 2017.

The audio processing module 2004 may receive sound signals through a microphone 2010 (for example, the microphone 172) in operation 2019.

The audio processing module 2004 may transmit the combined signal (for example, the signal output through the speaker 2008) to be used as echo reference data and the microphone input signal to the external pre-processing module 2006 in operation 2021. For example, the audio processing module 2004 may transmit the combined signal combined by the audio combination module 200 and the microphone input signal converted into a digital signal by the D/A converter 300 to the external pre-processing module 2006 as illustrated in FIG. 10.

The external pre-processing module 2006 may cancel the echo signal included in the microphone input signal by using the combined signal received from the audio processing module 2004 as echo reference data in operation 2023. For example, the first AEC 910 of the external pre-processing module 2006 may cancel the echo signal based on the echo reference data to execute the application to an extent that the voice signal included in the microphone input signal is not distorted as illustrated in FIG. 9. For example, the second AEC 920 of the external pre-processing module 2006 may cancel the echo signal included in the microphone input signal based on the echo reference data to provide the voice call service as illustrated in FIG. 9.

The external pre-processing module 2006 may transmit the microphone input signal, from which the echo signal is cancelled, to the audio processing module 2004 in operation 2025.

The audio processing module 2004 may transmit the microphone input signal, from which the echo signal is cancelled, received from the external pre-processing module 2006 to the AP 2000 and the communication module 2002 in operations 2027 and 2029.

Figure 21:
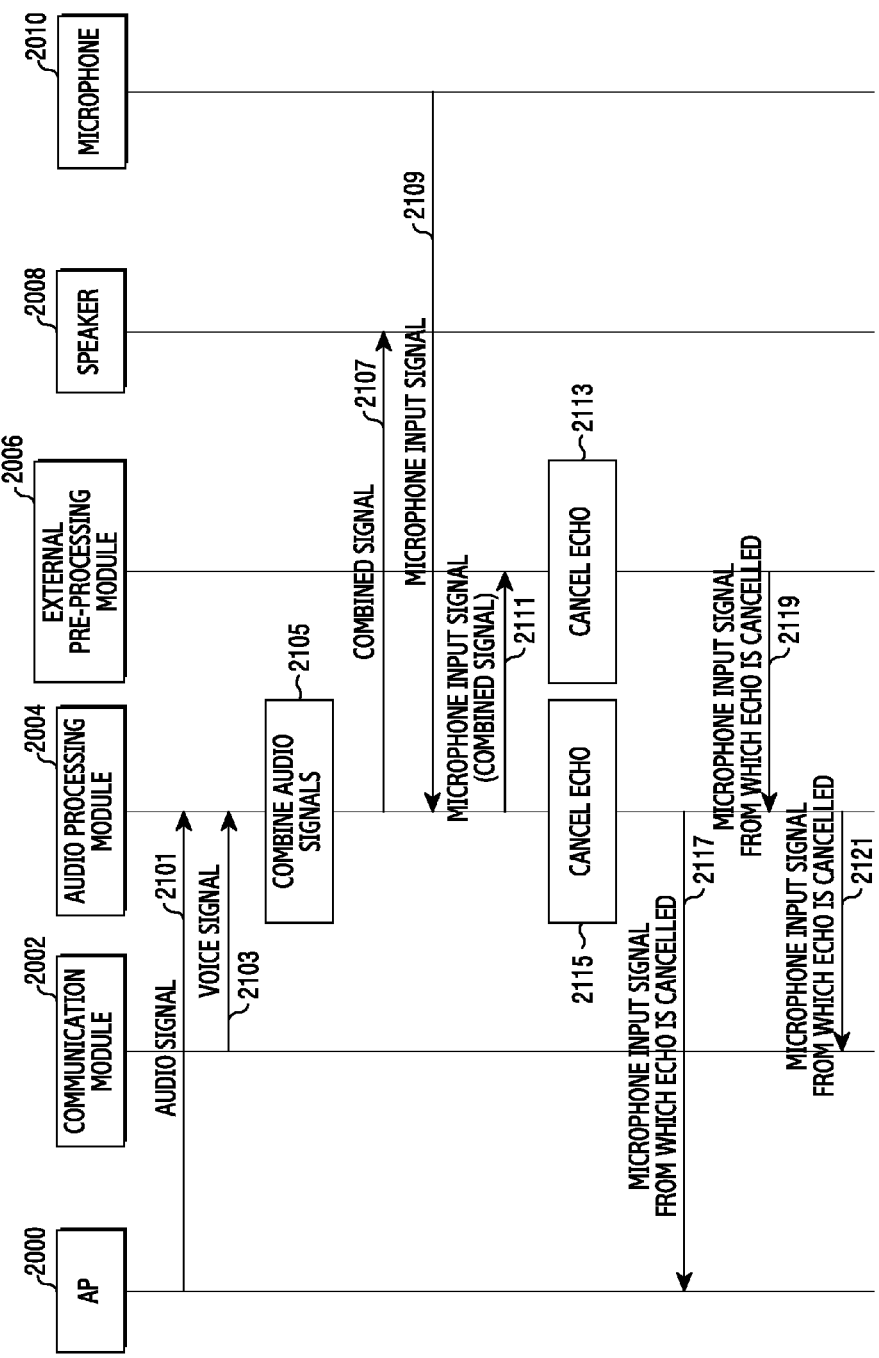
FIG. 21 is a signal flowchart illustrating an operation for cancelling the echo signal by using the external pre-processing module and the audio processing module by the electronic device according to various embodiments of the present disclosure.

FIG. 21 is a signal flowchart illustrating an operation for cancelling the echo signal by using the external pre-processing module and the audio processing module by the electronic device according to various embodiments of the present disclosure. Hereinafter, signal flows between the elements of the electronic device 100 to cancel the echo signal will be described.

Referring to FIG. 21, the AP 2000 (for example, the AP 120) may transmit an audio signal corresponding to driving of an application program to the audio processing module 2004 (for example, the audio processing module 170) in operation 2101.

The communication module 2002 (for example, the communication module 130) may transmit a voice signal for a voice call service to the audio processing module 2004 in operation 2103.

The audio processing module 2004 may combine the audio signal received from the AP 2000 and the voice signal received from the communication module 2002 into one signal in operation 2105.

The audio processing module 2004 may output the signal combined by the audio combination module 200 to the outside through the speaker 2008 (for example, the speaker 174) in operation 2107.

The audio processing module 2004 may receive sound signals through the microphone 2010 (for example, the microphone 172) in operation 2109.

The audio processing module 2004 may transmit the combined signal (for example, the signal output through the speaker 2008) to be used as echo reference data and the microphone input signal to the external pre-processing module 2006 in operation 2111.

The external pre-processing module 2006 may cancel the echo signal included in the microphone input signal by using the combined signal received from the audio processing module 2004 as echo reference data for the voice call service in operation 2113. For example, the second AEC 920 of the external processing module 2006 may cancel the echo signal included in the microphone input signal based on the echo reference data to provide the voice call service as illustrated in FIG. 12.

The external pre-processing module 2006 may transmit the microphone input signal, from which the echo signal is cancelled, to the audio processing module 2004 in operation 2119.

The audio processing module 2004 may transmit the microphone input signal, from which the echo signal is cancelled, received from the external pre-processing module 2006 to the communication module 2002 in operation 2121.

The audio processing module 2004 may cancel the echo signal included in the microphone input signal by using the combined signal as the echo reference data to execute the application of the AP 2000 in operation 2115. For example, the first AEC 201 of the audio processing module 2004 may cancel the echo signal included in the microphone input signal based on the echo reference data to execute the application as illustrated in FIG. 12.

The audio processing module 2004 may transmit the microphone input signal, from which the echo signal is cancelled, to the AP 2000 in operation 2117.

Figure 22:
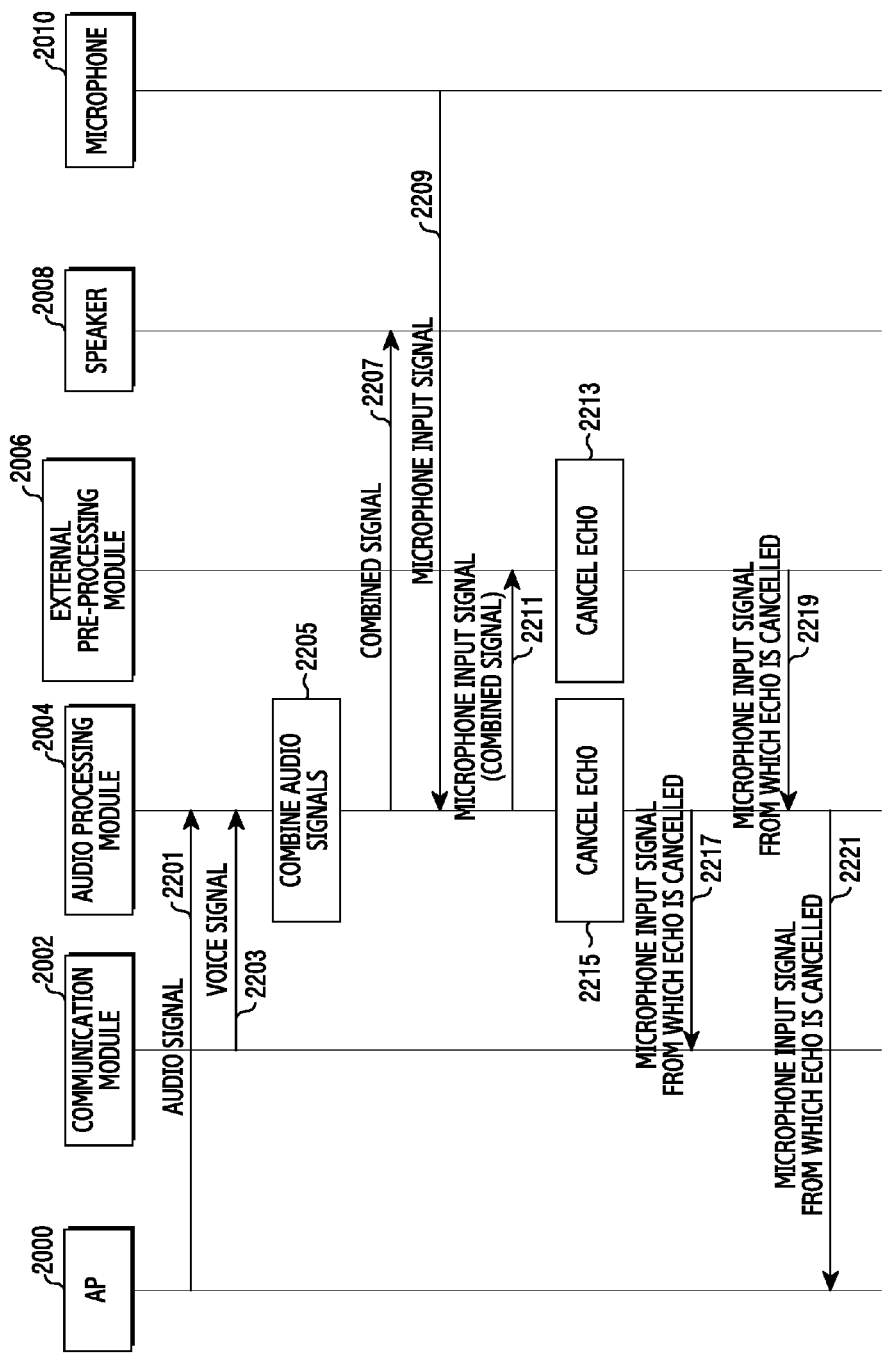
FIG. 22 is a signal flowchart illustrating an operation for cancelling the echo signal by using the external pre-processing module and the audio processing module by the electronic device according to various embodiments of the present disclosure.

FIG. 22 is a signal flowchart illustrating an operation for cancelling the echo signal by using the external pre-processing module and the audio processing module by the electronic device according to various embodiments of the present disclosure. Hereinafter, signal flows between the elements of the electronic device 100 to cancel the echo signal will be described.

Referring to FIG. 22, the AP 2000 (for example, the AP 120) may transmit an audio signal corresponding to driving of an application program to the audio processing module 2004 (for example, the audio processing module 170) in 2201.

The communication module 2002 (for example, the communication module 130) may transmit a voice signal for a voice call service to the audio processing module 2004 in operation 2203.

The audio processing module 2004 may combine the audio signal received from the AP 2000 and the voice signal received from the communication module 2002 into one signal in operation 2205.

The audio processing module 2004 may output the signal combined by the audio combination module 200 to the outside through the speaker 2008 (for example, the speaker 174) in operation 2207.

The audio processing module 2004 may receive sound signals through the microphone 2010 (for example, the microphone 172) in operation 2209.

The audio processing module 2004 may transmit the combined signal (for example, the signal output through the speaker 2008) to be used as echo reference data and the microphone input signal to the external pre-processing module 2006 in operation 2211.

The external pre-processing module 2006 may cancel the echo signal included in the microphone input signal by using the combined signal received from the audio processing module 2004 as echo reference data to execute the application in operation 2213. For example, the first AEC 910 of the external pre-processing module 2006 may cancel the echo signal included in the microphone input signal based on the echo reference data to execute the application of the AP 2000 as illustrated in FIG. 11.

The external pre-processing module 2006 may transmit the microphone input signal, from which the echo signal is cancelled, to the audio processing module 2004 in operation 2219.

The audio processing module 2004 may transmit the microphone input signal, from which the echo signal is cancelled, received from the external pre-processing module 2006 to the AP 2000 in operation 2221.

The audio processing module 2004 may cancel the echo signal included in the microphone input signal by using the combined signal as the echo reference data for the voice call service of the communication module 130 in operation 2215. For example, the second AEC 203 of the audio processing module 2004 may cancel the echo signal included in the microphone input signal based on the echo reference data for the voice call service as illustrated in FIG. 11.

The audio processing module 2004 may transmit the microphone input signal, from which the echo signal is cancelled, to the communication module 2002 in operation 2217.

Figure 23:
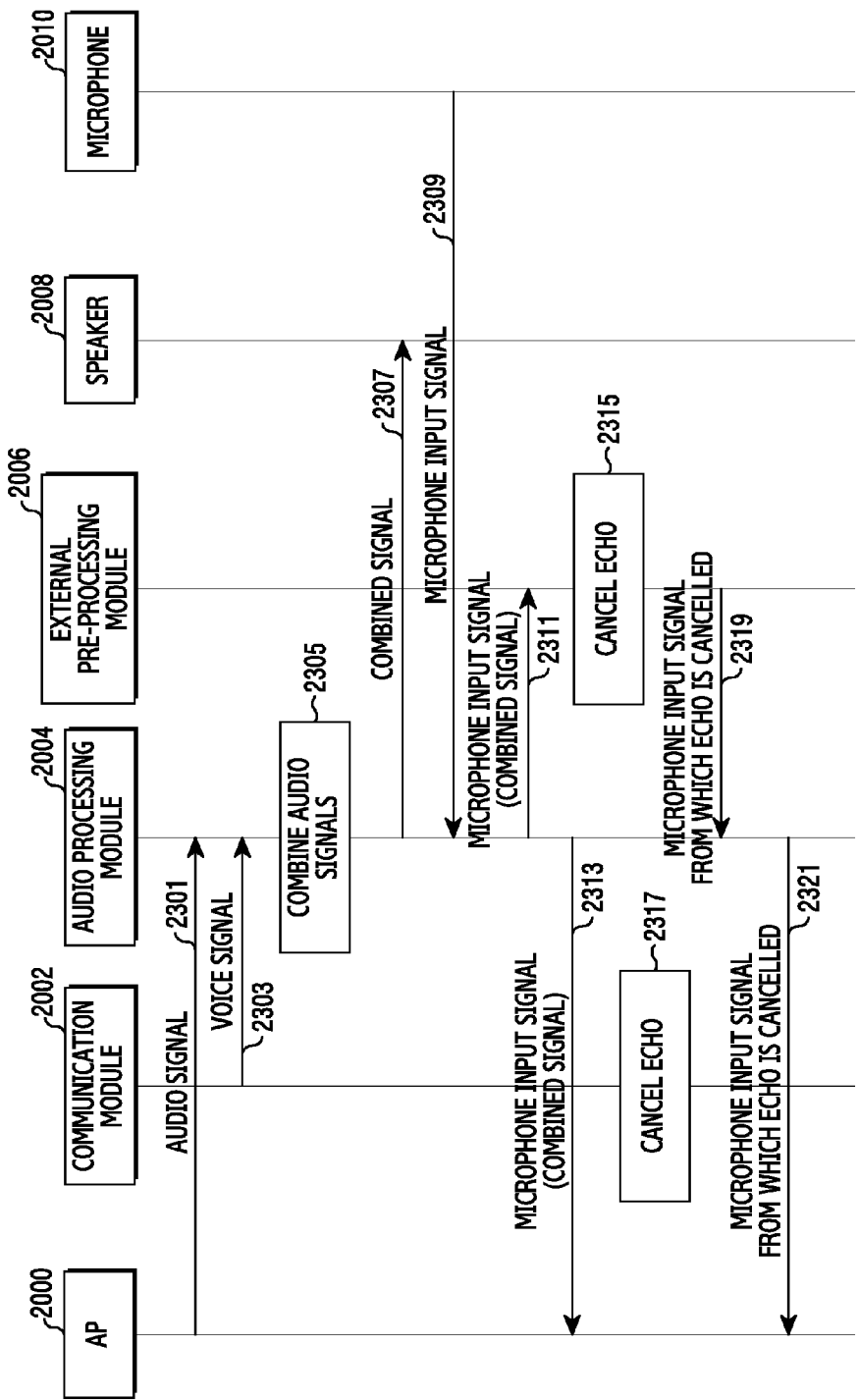
FIG. 23 illustrates a signal flowchart illustrating an operation for cancelling the echo signal by using the external pre-processing module and the communication module by the electronic device according to various embodiments of the present disclosure.

FIG. 23 illustrates a signal flowchart illustrating an operation for cancelling the echo signal by using the external pre-processing module and the communication module by the electronic device according to various embodiments of the present disclosure. Hereinafter, signal flows between the elements of the electronic device 100 to cancel the echo signal will be described.

Referring to FIG. 23, the AP 2000 (for example, the AP 120) may transmit an audio signal corresponding to driving of an application program to the audio processing module 2004 (for example, the audio processing module 170) in operation 2301.

The communication module 2002 (for example, the communication module 130) may transmit a voice signal for a voice call service to the audio processing module 2004 in operation 2303.

The audio processing module 2004 may combine the audio signal received from the AP 2000 and the voice signal received from the communication module 2002 into one signal in operation 2305.

The audio processing module 2004 may output the signal combined by the audio combination module 200 to the outside through the speaker 2008 (for example, the speaker 174) in operation 2307.

The audio processing module 2004 may receive sound signals through the microphone 2010 (for example, the microphone 172) in operation 2309.

The audio processing module 2004 may transmit the combined signal (for example, the signal output through the speaker 2008) to be used as echo reference data and the microphone input signal to the external pre-processing module 2006 in operation 2311.

The audio processing module 2004 may transmit the combined signal to be used as echo reference data and the microphone input signal to the communication module 2002 in operation 2313.

The external pre-processing module 2006 may cancel the echo signal included in the microphone input signal by using the combined signal received from the audio processing module 2004 as echo reference data to execute the application in operation 2315. For example, the first AEC 910 of the external pre-processing module 2006 may cancel the echo signal included in the microphone input signal based on the echo reference data to execute the application of the AP 2000 as illustrated in FIG. 13.

The external pre-processing module 2006 may transmit the microphone input signal, from which the echo signal is cancelled, to the audio processing module 2004 in operation 2319.

The audio processing module 2004 may transmit the microphone input signal, from which the echo signal is cancelled, received from the external pre-processing module 2006 to the AP 2000 in operation 2321.

The communication module 2002 may cancel the echo signal included in the microphone input signal based on the echo reference data received from the audio processing module 2004 in operation 2317. For example, the call pre-processing module 400 of the communication module 2002 may cancel the echo signal included in the microphone input signal based on the echo reference data (for example, the combined signal) received from the audio combination module 2004 for the voice call service as illustrated in FIG. 13.

Figure 24:
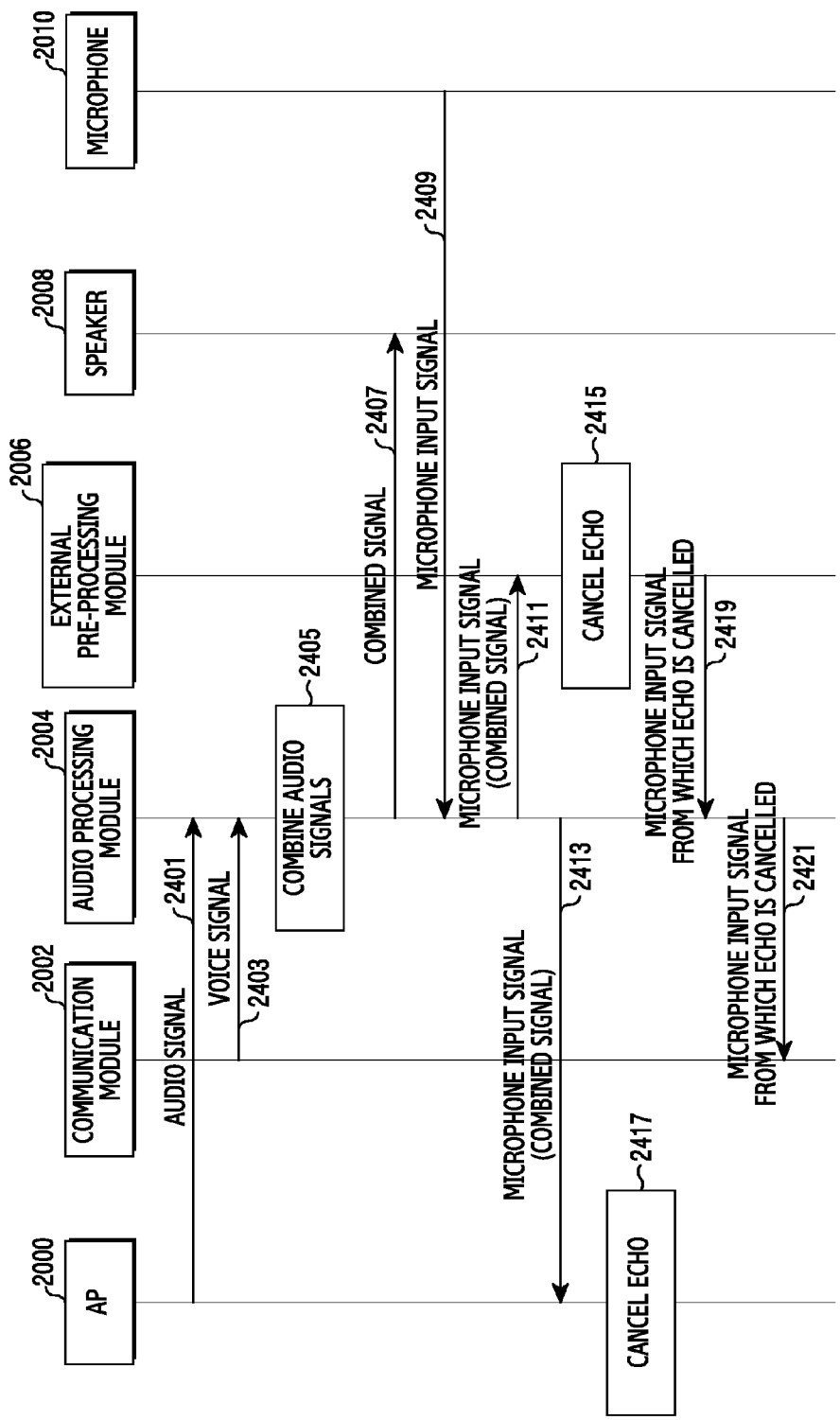
FIG. 24 illustrates a structure for cancelling the echo signal by using the external pre-processing module and the AP by the electronic device according to various embodiments of the present disclosure.

FIG. 24 illustrates a signal flowchart for cancelling the echo signal by using the external pre-processing module and the AP by the electronic device according to various embodiments of the present disclosure. Hereinafter, signal flows between the elements of the electronic device 100 to cancel the echo signal will be described.

Referring to FIG. 24, the AP 2000 (for example, the AP 120) may transmit an audio signal corresponding to driving of an application program to the audio processing module 2004 (for example, the audio processing module 170) in operation 2401.

The communication module 2002 (for example, the communication module 130) may transmit a voice signal for a voice call service to the audio processing module 2004 in operation 2403.

The audio processing module 2004 may combine the audio signal received from the AP 2000 and the voice signal received from the communication module 2002 into one signal in operation 2405.

The audio processing module 2004 may output the signal combined by the audio combination module 200 to the outside through the speaker 2008 (for example, the speaker 174) in operation 2407.

The audio processing module 2004 may receive sound signals through the microphone 2010 (for example, the microphone 172) in operation 2409.

The audio processing module 2004 may transmit the combined signal (for example, the signal output through the speaker 2008) to be used as echo reference data and the microphone input signal to the external pre-processing module 2006 in operation 2411.

The audio processing module 2004 may transmit the combined signal to be used as echo reference data and the microphone input signal to the AP 2000 in operation 2413.

The external pre-processing module 2006 may cancel the echo signal included in the microphone input signal by using the combined signal received from the audio processing module 2004 as echo reference data for the voice call service in operation 2415. For example, the second AEC 920 of the external processing module 2006 may cancel the echo signal included in the microphone input signal based on the echo reference data for the voice call service as illustrated in FIG. 14.

The external pre-processing module 2006 may transmit the microphone input signal, from which the echo signal is cancelled, to the audio processing module 2004 in operation 2419.

The audio processing module 2004 may transmit the microphone input signal, from which the echo signal is cancelled, received from the external pre-processing module 2006 to the communication module 2002 in operation 2421.

The AP 2000 may cancel the echo signal included in the microphone input signal based on the echo reference data received from the audio processing module 2004 in operation 2417. For example, the AP pre-processing module 500 of the AP 2000 may cancel the echo signal included in the microphone input signal based on the echo reference data (for example, the combined signal) received from the audio processing module 2004 to execute the application of the AP 2000 as illustrated in FIG. 14.

An electronic device and a method according to various embodiments remove an echo signal flowing in through a microphone based on a signal (audio signal, a voice signal, or a combined signal) processed by, for example, an audio processing module (for example, codec), thereby improving call quality and quality of an audio service provided by an Application Processor (AP) using an audio signal received through the microphone.

The term "module" as used herein may, for example, mean a unit including one of hardware, memory storing software, and memory storing firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. An electronic device comprising:
   a microphone;
   an Application Processor (AP);
   a communication module configured to control a voice call service;
   an audio processing module configured to:
     provide an audio signal of a first audio signal received from the AP, a second audio signal received from the communication module, or a combined audio signal from the first audio signal and the second audio signal to a speaker;
     provide the audio signal to a first and a second Acoustic Echo Canceller (AEC);
   the speaker configured to output the audio signal;
   the first and second AEC configured to cancel an echo of an input sound signal received through the microphone based on the provided audio signal from the audio processing module, and respectively provide an echo-cancelled signal to the AP and the communication module,
   wherein at least one AEC of the first and second AEC is located in the audio processing module
   wherein the echo corresponds to the audio signal output by the speaker.

2. The electronic device of claim 1,
   wherein the first AEC is further configured to cancel an echo of the input sound signal received through the microphone based on the provided audio signal from the audio processing module according to a first level, thereby resulting in a first echo-cancelled signal, and provide the first echo-cancelled signal to the AP wherein the second AEC is further configured to cancel an echo of the sound signal received through the microphone based on the provided audio signal from the audio processing module according to a second level, thereby resulting in a second echo-cancelled signal, and provide the second echo-cancelled signal to the communication module.

3. The electronic device of claim 2, wherein the second level is lower than the first level.

4. The electronic device of claim 1, wherein the first AEC is further configured to, when an application is executed using the AP, cancel an echo of the input sound signal received through the microphone based on the provided audio signal from the audio processing module according to a first level, and provide the echo-cancelled signal to the AP;

wherein the second AEC is further configured to, when a voice call service is provided using the communication module, cancel an echo of the input sound signal received through the microphone based on the provided audio signal from the audio processing module according to a second level, and provide the echo-cancelled signal to the communication module.

5. The electronic device of claim 4, wherein the second level is lower than the first level.

6. A method of operating an electronic device, the method comprising:

providing an audio signal of a first audio signal generated from an Application Processor (AP) and a second audio signal from a communication module, or a combined audio signal from the first audio signal and the second audio signal to a speaker;

providing the audio signal to a first and a second Acoustic Echo Canceller, outputting the audio signal through the speaker, cancelling an echo from an input sound received through a microphone of the electronic device based on the provided audio signal from the audio processing module, through the first AEC and the second AEC, and providing respectively the echo-cancelled signal to the AP and the communication module;

wherein at least one AEC of the first and second AEC is located in the audio processing module wherein the echo corresponds to the audio signal output by the speaker.

7. The electronic device of claim 6, wherein the cancelling of the echo comprises cancelling, through the first AEC, the echo from the input sound signal received through the microphone of the electronic device based on the provided audio signal from the audio processing module according to a first level, thereby resulting in a first echo-cancelled signal, and cancelling, through the second AEC, the echo from the input sound signal received through the microphone of the electronic device based on the provided audio signal from the audio processing module according to a second level lower than the first, thereby resulting in a second echo-cancelled signal.

8. The electronic device of claim 7, wherein the providing the echo-cancelled signal comprises providing the first echo-cancelled signal to the AP; and providing the second echo-cancelled signal to the communication module.

9. The electronic device of claim 8, wherein the first AEC provides the first echo cancelled signal to the AP and the second AEC provides the second echo cancelled signal to the communication module.

10. The electronic device of claim 6, wherein the cancelling of the echo comprises:

when an application is executed using the AP, cancelling, by the first AEC, an echo of an input sound signal received through the microphone based on the provided audio signal from the audio processing module according to a first level; and when a voice call service is provided using the communication module, cancelling, by the second AEC, an echo of the input sound signal received through the microphone based on the provided audio signal from the audio processing module according to a second level.

* * * * *